(12) United States Patent
Levy

(10) Patent No.: US 11,192,649 B2
(45) Date of Patent: Dec. 7, 2021

(54) METHOD, SYSTEM, AND APPARATUS OF FLIGHT SYSTEM FOR INDIVIDUAL USERS

(71) Applicant: Beyonder Industries LLC, New York, NY (US)

(72) Inventor: Ely Samuel Levy, New York, NY (US)

(73) Assignee: BEYONDER INDUSTRIES LLC, New York, NY (US)

(*) Notice: Subject to any disclaimer, the term of this patent is extended or adjusted under 35 U.S.C. 154(b) by 533 days.

(21) Appl. No.: 16/298,713

(22) Filed: Mar. 11, 2019

(65) Prior Publication Data
US 2019/0202559 A1   Jul. 4, 2019

Related U.S. Application Data

(60) Provisional application No. 62/641,243, filed on Mar. 9, 2018, provisional application No. 62/758,085, filed on Nov. 9, 2018.

(51) Int. Cl.
| B64D 27/24 | (2006.01) |
| F04D 27/00 | (2006.01) |
| F04D 25/06 | (2006.01) |
| B64C 39/02 | (2006.01) |
| F04D 29/60 | (2006.01) |
| B64C 11/00 | (2006.01) |
| F04D 19/00 | (2006.01) |
| F04D 25/16 | (2006.01) |

(52) U.S. Cl.
CPC .......... *B64C 39/026* (2013.01); *B64C 11/001* (2013.01); *B64D 27/24* (2013.01); *F04D 25/06* (2013.01); *F04D 27/004* (2013.01); *F04D 29/601* (2013.01); *F04D 19/002* (2013.01); *F04D 25/166* (2013.01)

(58) Field of Classification Search
CPC ... B64C 39/026; B64D 27/24; F04D 25/0673; F04D 25/06; F04D 27/004; F04D 19/002; F04D 29/601; F04D 29/644; F04D 29/646
See application file for complete search history.

(56) References Cited

U.S. PATENT DOCUMENTS

| 6,874,728 B2* | 4/2005 | Lau ................. B64C 15/02 244/4 A |
| 8,894,015 B2* | 11/2014 | Contoret ........... B64C 31/036 244/151 R |
| 2008/0142644 A1* | 6/2008 | O'Roark .......... B64C 39/026 244/4 A |
| 2009/0020654 A1* | 1/2009 | Tyler ................ B64C 39/026 244/23 A |

* cited by examiner

*Primary Examiner* — Richard R. Green
*Assistant Examiner* — Nor Alaa Bashash
(74) *Attorney, Agent, or Firm* — Ladas & Parry LLP

(57) ABSTRACT

The present invention relates to a method, system, and apparatus of flight system for individual users using electric ducted fans. The flight system comprises a modular unit, which comprises a plurality of electric ducted fans, means for connecting electric ducted fans, and a pair of armpit supports. The flight system further comprises means for securing a modular unit around respective left and right shoulders of a user. In one embodiment, the flight system can be controlled to generate a horizontal acceleration of 20 MPH/second and a vertical acceleration of 10 MPH/second.

22 Claims, 22 Drawing Sheets

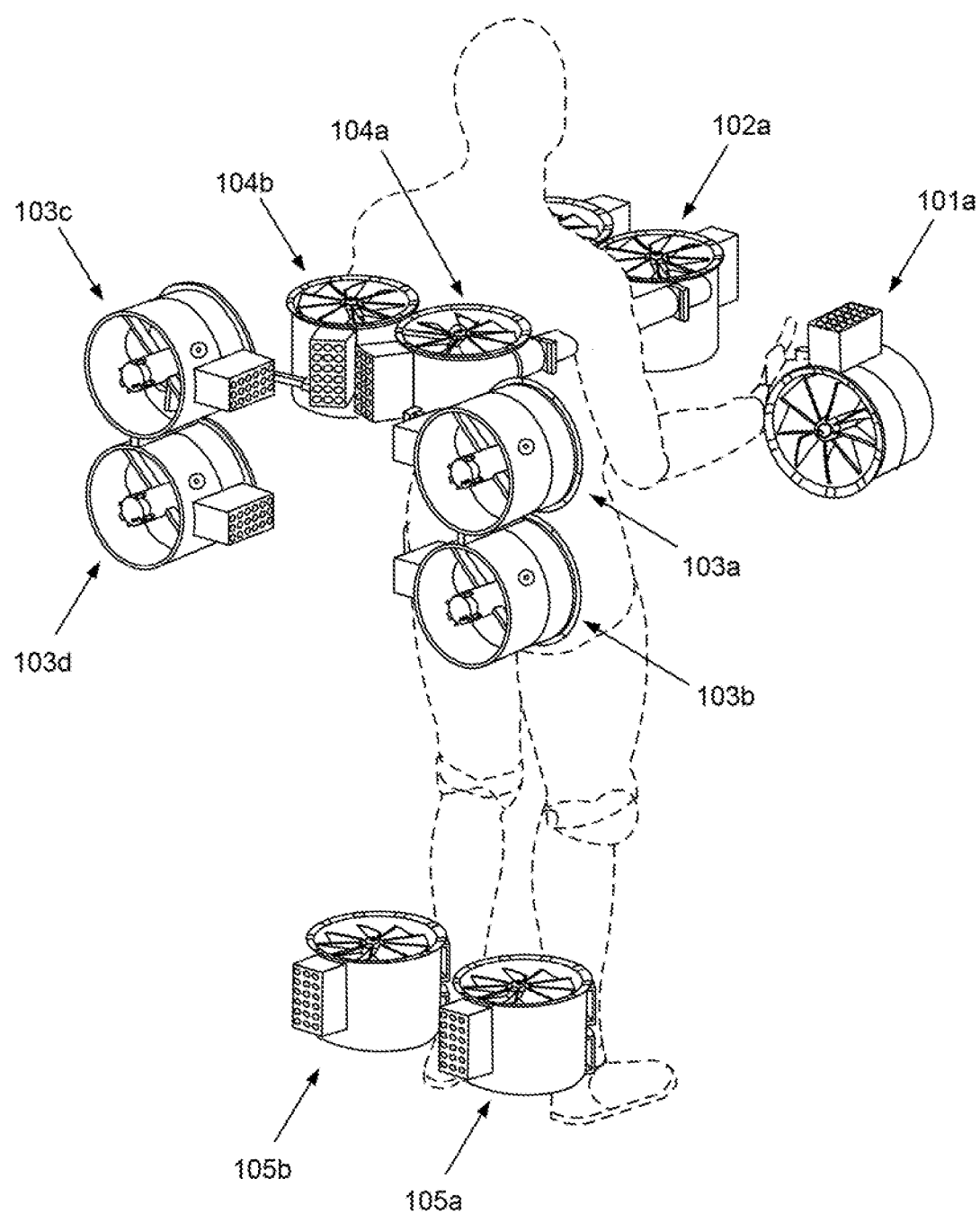
F I G. 4

METHOD, SYSTEM, AND APPARATUS OF FLIGHT SYSTEM FOR INDIVIDUAL USERS

CROSS-REFERENCE TO RELATED APPLICATION

The present application claims priority from U.S. Provisional Application No. 62/641,243 filed on Mar. 9, 2018 and U.S. Provisional Application No. 62/758,085 filed on Nov. 9, 2018 and incorporates them by reference herein in their entirety.

BACKGROUND OF THE INVENTION

Field of the Invention

The present invention generally relates a flying vehicle for an individual user. More specifically, the present invention relates to a method, system, and apparatus of flight system for individual users using electric ducted fans.

Related Art

For over one hundred years, human beings have had the ability to fly using airplanes. Later on, the helicopter was invented. More recently, some innovators have been working on propulsion systems for individual users. Some of these use one or more fans for propulsion and ability to control thrust. For example, U.S. Patent Application Publication No. 2016/0340035 A1 to Duru, U.S. Patent Application Publication No. 2012/0226394 A1 to Marcus, U.S. Pat. No. 8,695,916 B2 to Martin, et al., U.S. Pat. No. 9,114,695 B2 to Burgess, and U.S. Pat. No. 4,189,019 A to Zech, U.S. Pat. No. 3,023,980 A to Cummings, all of which are incorporated herein by reference in their entirety, disclose using at least one fan to lift a user from the ground. However, these are deficient in that they are complicated and expensive. Thus, there is a need for a safe, affordable, reliable, and environmentally friendly individual flight system.

SUMMARY OF THE INVENTION

The following presents a simplified summary in order to provide a basic understanding of some aspects described herein. This summary is not an extensive overview of the claimed subject matter. It is intended to neither identify key or critical elements, of the claimed subject matter nor delineate the scope thereof its sole purpose to present some concepts in a simplified for as a prelude to the more detailed description that is presented later.

In a first embodiment, there is provided a flight system for an individual user comprising (a) at least eight (8) electric ducted fans (EDFs), each of the at least eight (8) EDFs comprising a plurality of blades, a motor and an electronic speed control unit that controls a speed of rotation of the plurality of blades of the respective EDFs; (b) first means for attaching first, second, third and fourth of the at least eight (8) EDFs to a torso of a body of a user with the first EDF disposed adjacent a front of the torso of the user on a right side of the user's body, with the second EDF disposed adjacent the front of the torso of the user on a left side of the user's body, with the third EDF disposed adjacent a back of the torso on the right side of the user's body, with the fourth EDF disposed adjacent the back of the torso on the left side of the user's body, and with the first, second third and fourth EDFs oriented to provide a downward thrust toward the ground with the user in an upright position vertical to the ground so as to apply an upward force to the user when the first, second, third and fourth EDFs are activated, (c) second means for attaching a fifth of the EDFs to an ankle on the right side of the user's body with the fifth EDF oriented to provide a downward thrust toward the ground with the user in the upright position so as to apply an upward force to the user when the fifth EDF is activated; (d) third means for attaching a sixth of the EDFs to an ankle on the left side of the user's body with the sixth EDF oriented to provide a downward thrust toward the ground with the user in the upright position so as to apply an upward force to the user when the sixth EDF is activated; (e) fourth means for attaching a seventh of the EDFs to a wrist on the right side of the user's body with the seventh EDF oriented to enable the user to provide a thrust in any of a plurality of directions upon movement of the right wrist of the user; (f) fifth means for attaching an eighth of the EDFs to a wrist on the left side of the user's body with the eighth EDF oriented to enable the user to provide a thrust in any of a plurality of directions upon movement of the left wrist of the user; (g) control means disposed on each of the seventh and eighth EDFs for enabling the user to control activation and speed of rotation of the respective blades of the at least eight (8) EDFs such that, with the first, second, third, fourth, fifth and sixth EDFs attached to the respective torso and ankle of the user and the seventh and eighth EDFs attached to the left and right wrists of the user respectively, the user can activate the at least eight EDFs and can selectively control rotation of the plurality of blades of the respective first, second, third, fourth, fifth and sixth EDFs such that the user can cause them to rotate at the same speed of rotation to provide a combined downward thrust toward the ground with the user in the upright position and the user can also cause a preferential increase in the speed of rotation of the third and fourth EDFs to create a disproportionate thrust of the third and fourth EDFs toward the ground that applies a force that causes the user to tilt forward from the upright position and moves the user forward. In this embodiment, the combined downward thrust toward the around of the first, second, third, fourth, fifth and sixth EDFs is sufficient to lift a user weighing more than 75 lbs and up to at least 200 lbs, more preferably up to at least 250 lbs and still more preferably up to at least 300 lbs off of the ground and into a flight.

In one aspect of the embodiment, the plurality of blades of the first, third, fifth and seventh EDFs rotate in an opposite direction to the plurality of blades of the second, fourth, sixth and eighth EDFs to inhibit yaw or roll due to centrifugal force of rotation of the plurality of blades.

In yet another aspect, the flight system comprises stabilizing means for detecting respective directions at which the respective first, second, third, fourth, fifth and sixth EDFs are generating thrust while the user is in the flight and, if the detected directions of thrust are such as to render the flight unstable according to a predetermined standard, for automatically adjusting respective speeds of rotation of the respective blades of the EDFs to stabilize the flight.

In still another aspect, the stabilizing means comprises an accelerometer and a computer board.

In another embodiment of the invention, a flight system comprises (a) at least ten (10) electric ducted fans (EDFs), each of the at least ten (10) EDFs comprising a plurality of blades, a motor and an electronic speed control unit that controls a speed of rotation of the plurality of blades of the respective EDFs; (b) first means for attaching first, second, third, fourth, ninth and tenth of the at least ten (10) EDFs to a body of a user with the first EDF disposed adjacent a front of a torso of the user on a right side of the user's body, with the second EDF disposed adjacent the front of the torso of the user on a left side of the user's body, with the third EDF disposed adjacent a back of the torso on the right side of the user's body, with the fourth EDF disposed adjacent the back of the torso on the left side of the user's body, with the ninth EDF disposed adjacent the third EDF and spaced from the back of the torso on the right side of the user's body, with the tenth EDF disposed adjacent the fourth EDF and spaced from the back of the torso on the lefts side of the user's body, with the first, second third and fourth EDFs oriented to provide a downward thrust toward the ground with the user in an upright position vertical to the ground so as to apply an upward force to the user when the first, second, third and fourth EDFs are activated, and with the ninth and tenth EDFs oriented to provide a backward thrust that is transverse to the downward thrust with the user in the upright position so as to apply a force that propels the user forward when the ninth and tenth EDFs are activated; (c) second means for attaching a fifth of the EDFs to an ankle on the right side of the user's body with the fifth EDF oriented to provide a downward thrust toward the ground with the user in the upright position so as to apply an upward force to the user when the fifth EDF is activated; (d) third means for attaching a sixth of the EDFs to an ankle on the left side of the user's body with the sixth EDF oriented to provide a downward thrust toward the ground with the user in the upright position so as to apply an upward force to the user when the sixth EDF is activated; (e) fourth means for attaching a seventh of the EDFs to a wrist on the right side of the user's body with the seventh EDF oriented to enable the user to provide a thrust in any of a plurality of directions upon movement of the right wrist of the user; (f) fifth means for attaching an eighth of the EDF's to a wrist on the left side of the user's body with the eighth EDF oriented to enable the user to provide a thrust in any of a plurality of directions upon movement of the left wrist of the user; (g) control means disposed on each of the seventh and eighth EDFs for enabling the user to control activation and speed of rotation of the respective blades of the at least ten (10) EDFs such that, with the first, second, third, fourth, fifth, sixth, ninth and tenth EDFs attached to the torso and ankles of the user and the seventh and eighth EDFs attached to the left and right wrists of the user respectively, the user can activate the at least ten EDFs and can selectively control rotation of the plurality of blades of the respective first, second, third, fourth, fifth and sixth EDFs to cause them to rotate at the same speed of rotation to provide a combined downward thrust toward the ground with the user in the upright position and the user can also activate and control speeds of rotation of the plurality of blades of the respective ninth and tenth EDFs to provide a backward thrust to propel the user forward. In this embodiment, the combined downward thrust toward the ground of the first, second, third, fourth, fifth and sixth EDFs is sufficient to lift a user weighing more than 75 lbs off of the ground and into a flight.

Preferably, the plurality of blades of the first, third, fifth, seventh and ninth EDFs rotate in an opposite direction to the plurality of blades of the second, fourth, sixth, eighth and tenth EDFs to inhibit yaw or roll due to centrifugal force of rotation of the plurality of blades.

In one aspect of the embodiment, the flight system further comprises stabilizing means for detecting, respective directions at which the respective first, second, third, fourth, fifth, sixth, ninth and tenth EDFs are generating thrust while the user is in the flight and, if the detected directions of thrust are such as to render the flight unstable according to a predetermined standard, for automatically adjusting respective speeds of rotation of the respective blades of the EDFs to stabilize the flight.

In another aspect, the stabilizing means comprises an accelerometer and a computer board.

In another embodiment of the invention, the flight system further comprises an eleventh EDF and a twelfth EDF, wherein the first means attaches the first, second, third, fourth, ninth, tenth, eleventh and twelfth EDFs to the torso of the user with the eleventh EDF disposed below the ninth EDF and spaced from the back of the torso on the right side of the user's body, with the twelfth EDF disposed below the tenth EDF and spaced from the back of the torso on the left side of the user's body, and with the eleventh and twelfth EDFs oriented to provide a backward thrust that is transverse to the downward thrust with the user in the upright position so as to apply a force that propels the user forward when the eleventh and twelfth EDFs are activated.

In another embodiment of the invention, there is provided a method for individual flight comprising the steps of (a) providing the flight system comprising the at least eight (8) EDFs, (b) attaching the at least eight (8) EDFs to respective parts of the body of a user; and (c) using the control means to activate and control rotation of the plurality of blades of the first, second, third, fourth, fifth and sixth EDFs to cause a downward thrust that propels the user into flight.

In another aspect of the embodiment, the method further comprises using the control means to cause a preferential increase in the speed of rotation of the third and fourth EDFs to create a disproportionate thrust toward the ground that propels the user forward.

In another embodiment of the invention, there is provided a method for individual flight comprising the steps of (a) providing the flight system comprising the at least ten (10) EDFs, (b) attaching, the at least ten (10) EDFs to respective parts of the body of a user; and (c) using the control means to activate and control rotation of the plurality of blades of the first, second, third, fourth, fifth and sixth EDFs to cause a downward thrust that propels the user into flight.

In another aspect of the embodiment, the method according further comprises using the control means to cause the ninth and tenth EDFs to provide a backward thrust to propel the user forward.

In another embodiment of the invention, there is provided a method further comprises (d) causing the ninth and tenth EDFs to apply a backward thrust to an upper portion of the user's body, moving the user forward and tilting the upper portion of the user's body forward in an air; (e) measuring an angle change of at least one of the first, second, third, fourth, ninth, and tenth EDFs; and (f) generating a downward thrust by the first, second, third, and fourth EDFs to compensate for an upward thrust generated by the ninth and tenth EDFs due to the angle change. In this embodiment, an overall backward thrust is at least a vector sum of backward thrusts of the first, second, third, fourth, ninth, and tenth EDFs.

BRIEF DESCRIPTION OF THE DRAWINGS

The features and advantages of the present invention will be more readily understood from a detailed description of the example embodiments taken in conjunction with the following figures in which:

FIG. 4 is a rear perspective view of a flight system according to an exemplary embodiment.

DETAILED DESCRIPTION OF THE INVENTION

Figure 1:
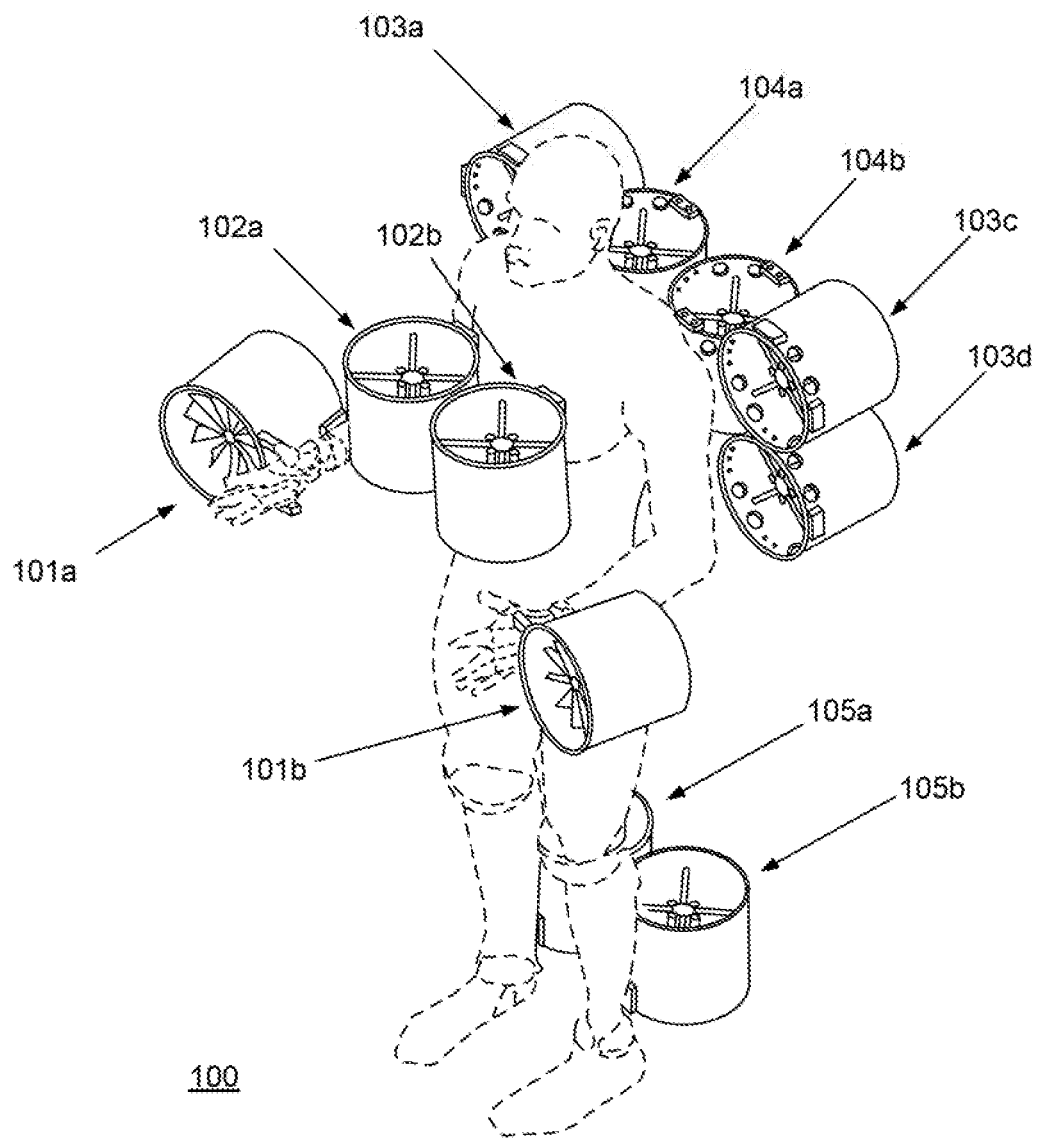
FIG. 1 is a front perspective view of a flight system according to an exemplary embodiment.

The present invention is now described in terms of an example system in which the present invention, in various embodiments, would be implemented. This is for convenience only and is not intended to limit the application of the present invention. It will be apparent to one skilled in the relevant art(s) how to implement the present invention in alternative embodiments. The claimed subject matter is described with reference to the drawings, wherein like reference numerals are used to refer to like elements throughout.

Referring to FIG. 1, there is seen a flight system 100 according to one embodiment of the invention. In this embodiment, the flight system 100 comprises twelve fans. Preferably, the fans are electric ducted fans (EDFs). A ducted fan is a propulsion arrangement whereby a mechanical fan, which is a type of propeller, is mounted within a cylindrical shroud or duct. The duct reduces losses in the thrust from the tips of the props, and varying the cross-section of the duct allows the designer to advantageously affect the velocity and pressure of the airflow according to Bernoulli's principle. For example, ducted fan propulsion is used in aircraft, airships, airboats, hovercraft, and fan packs. Ducted fans normally have more and shorter blades than conventional propellers and thus can operate at higher rotational speeds.

Still referring to FIG. 1, the two electric ducted fans (EDFs) on the chest 102a, 102b ("Front EDFs") are welded together, and the two EDFs on the back 104a, 104b ("Back EDFs") are welded together. The Front EDFs 102a, 102b are strapped to the user's chest. The Back EDFs 104a, 104b are strapped to the user's back. The Front EDFs 102a, 102b and the Back EDFs 104a, 104b can be strapped to the user's torso together or separately. Two EDFs 105a, 105b ("Leg EDFs") are strapped to the left and right legs of the user (e.g., around each Achilles tendon), respectively, via strap around the ankle of a boot. These EDFs 105a, 105b can provide thrust in any direction. However, the majority of their use will be providing downward thrust (lifting the user upwards). They can also be expected to be used for creating backward thrust (moving the user forwards). There are many benefits of having the Leg EDFs 105a, 105b. These include a more seamless flight experience for the user, as well as an alleviation of pressure under the user's armpits applied by metal bars 206a, 206b during flight. The Front EDFs 102a, 102b, Back EDFs 104a, 104b, and Leg EDFs 105a, 105b produce downward thrust and are the primary source of thrust for moving the user upwards. Commercially available straps and strap hooks can be used as fastening means. Adjustable shoulder straps firmly secure the Front EDFs 102a, 102b on the chest and the Back EDFs 104a, 104b on the back to the user's torso by connecting the left and right intake ends of the Back EDFs 104a, 104b with the left and right intake ends of the Front EDFs 102a, 102b, respectively.

Figure 7:
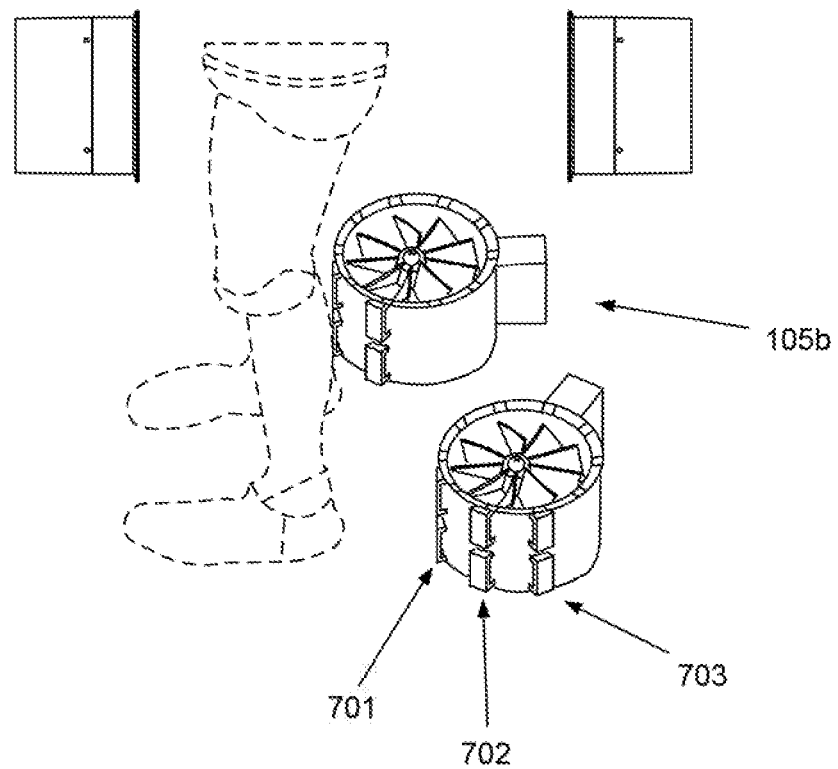
FIG. 7 is a close-up view of a leg fan according to an exemplary embodiment.
Figure 8:
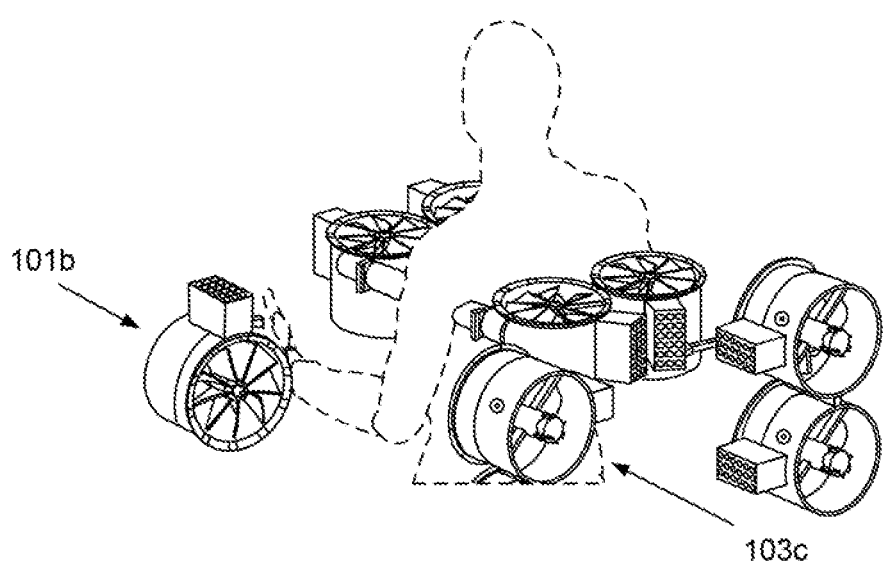
FIG. 8 is a rear perspective view of a flight system according to an exemplary embodiment.

The flight system may comprise customized boots. The straps are designed to be attached to virtually any boots that are commercially available. The straps should also be able to be attached to the user regardless of his or her footwear. The Achilles tendon hooks and straps serve as an alternative means for holding the leg EDFs in place when boots are not desirable. These hooks/straps serve the purpose of securing the EDF to the user's Achilles tendon as well as preventing rotational slippage (around the user's ankle). They exist to ensure that the EDFs cannot move independently of the user's legs. Referring to FIG. 7, the straps that secure the EDFs to the user's Achilles tendons run through the strap hooks 701, 702, 703. First, the user grabs a strap that runs through the center hooks 702 and tightens/secures the strap on their shin. Next, the user grabs a strap that runs through the side hooks 701, 703 and tightens/secures it on their shin.

This should secure the EDF to the user's Achilles tendon to the satisfaction of the above description.

In FIG. 1, four fans 103a, 103b (not shown), 103c, 103d that produce backward thrust ("Backward Thrust EDFs") are welded to the back EDFs 104a, 104b. Two 103c, 103d of the Backward Thrust EDFs 103a-d are welded to a Back EDF 104a on the left, and the other two 103a, 103b of the Backward Thrust EDFs 103a-d are welded to a Back EDF 104b on the right. The Backward Thrust EDFs 103a-d are the primary source of thrust used to move the user forward. Alternatively, the Backward Thrust EDFs 103a-d are attached via welded bars 206a, 206b that 1) keep them out of the reach of the user's arms (to avoid injuries), 2) keep them far away enough from the air intake of the Back EDFs 104a, 104b (so that their thrusts do not cancel each other out), and 3) create a sturdy, reliable structure.

Figure 2:
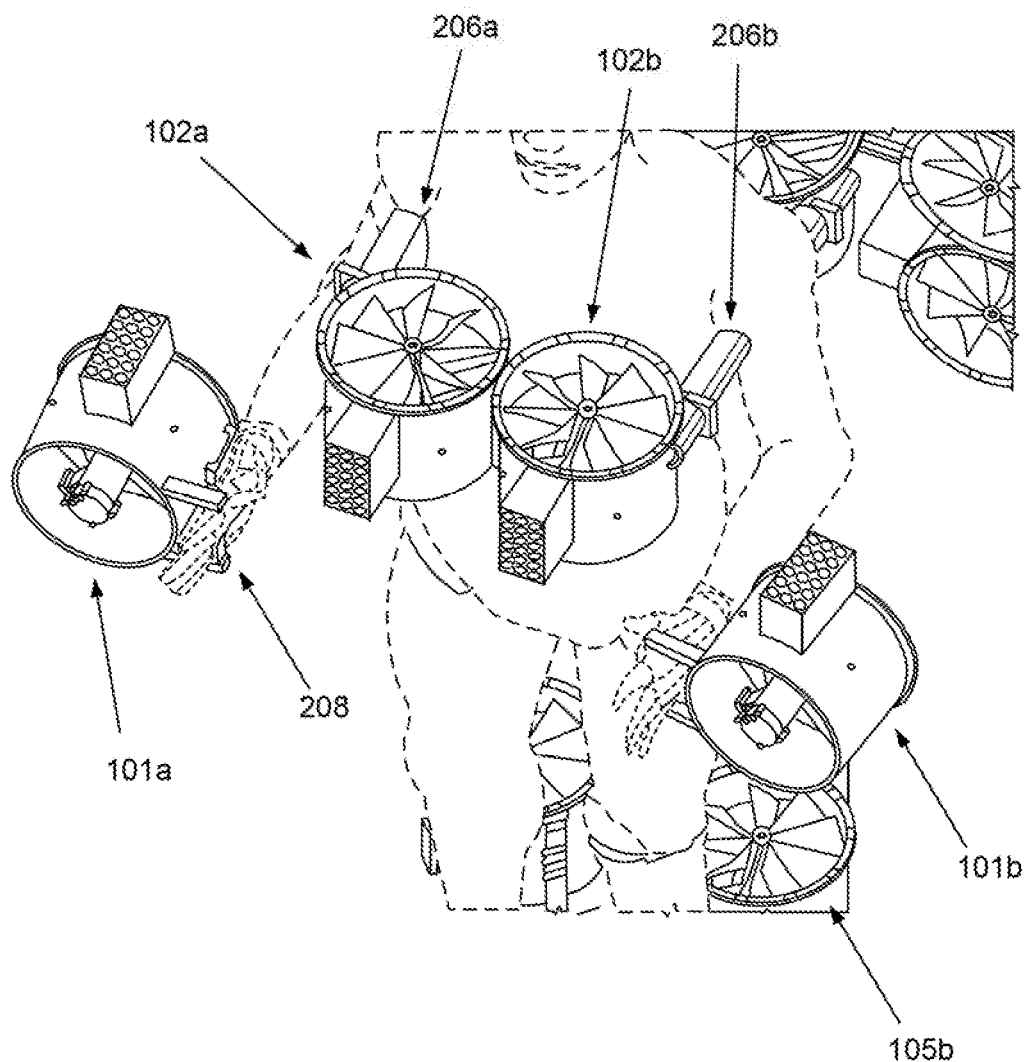
FIG. 2 is a top perspective view of a flight system according to an exemplary embodiment.
Figure 3:
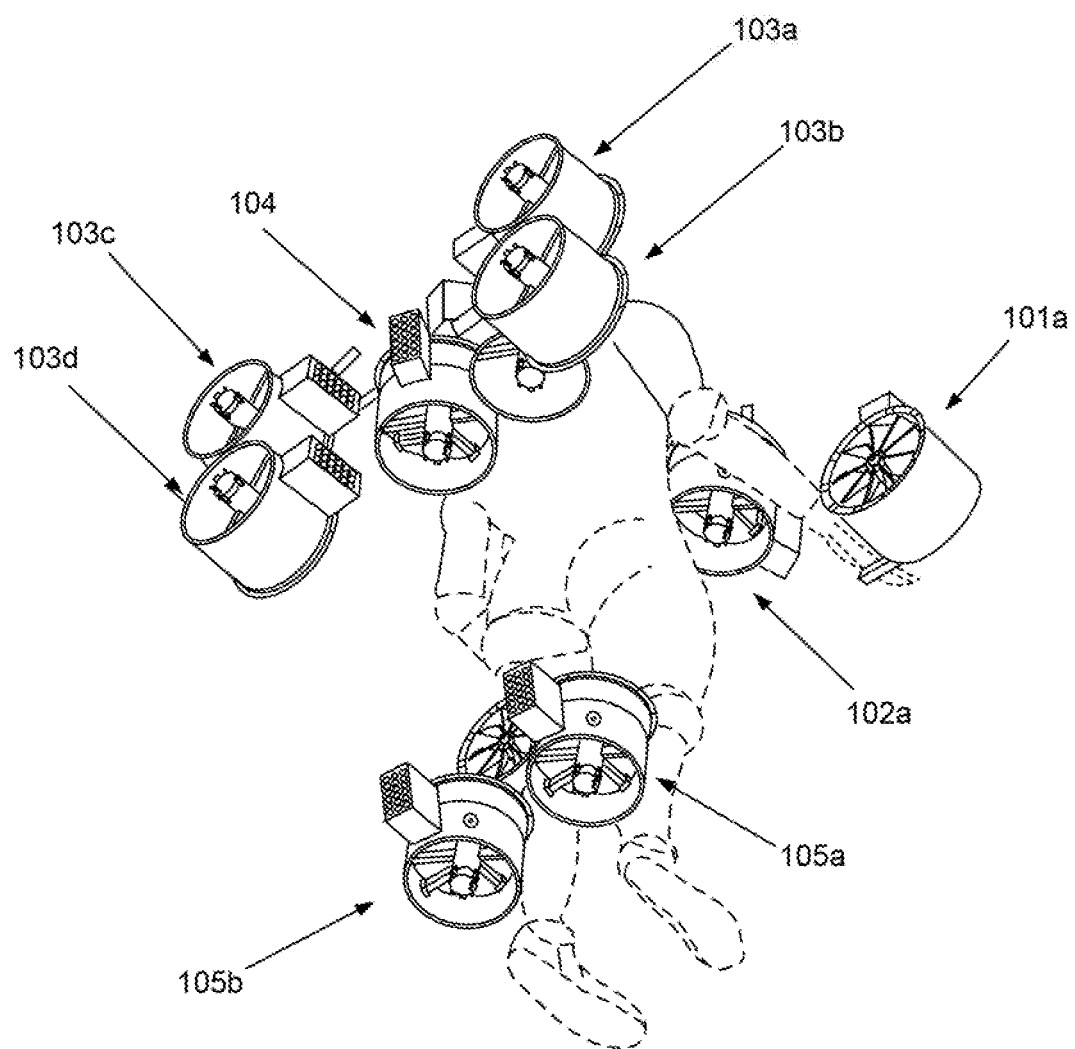
FIG. 3 is a bottom perspective view of a flight system according to an exemplary embodiment.
Figure 5A:
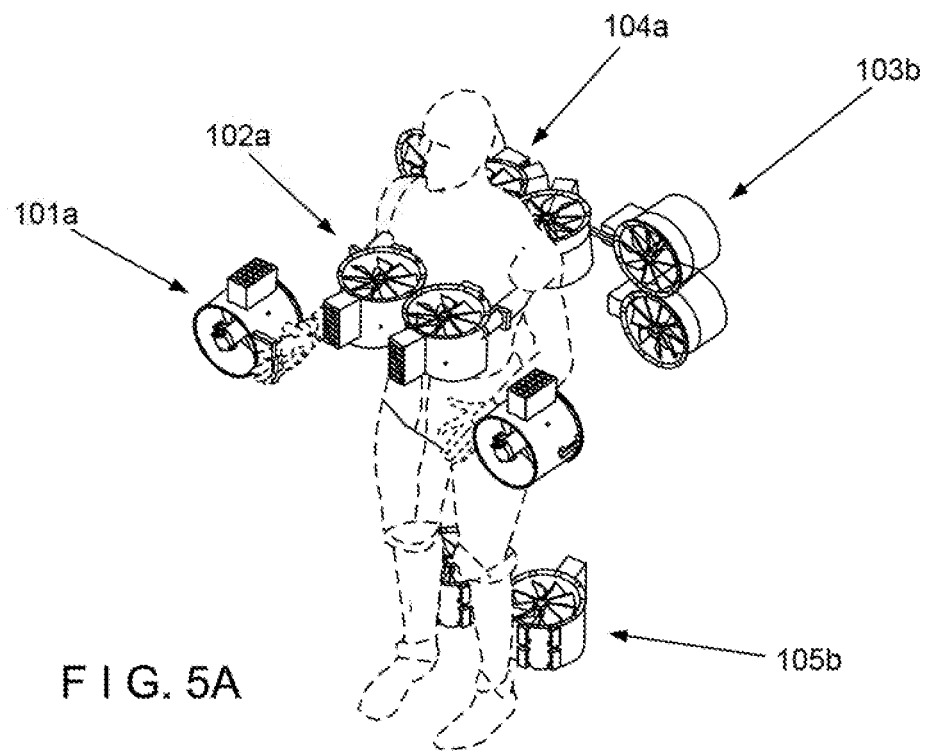
FIG. 5A is a front perspective view of a flight system according to an exemplary embodiment.
Figure 5B:
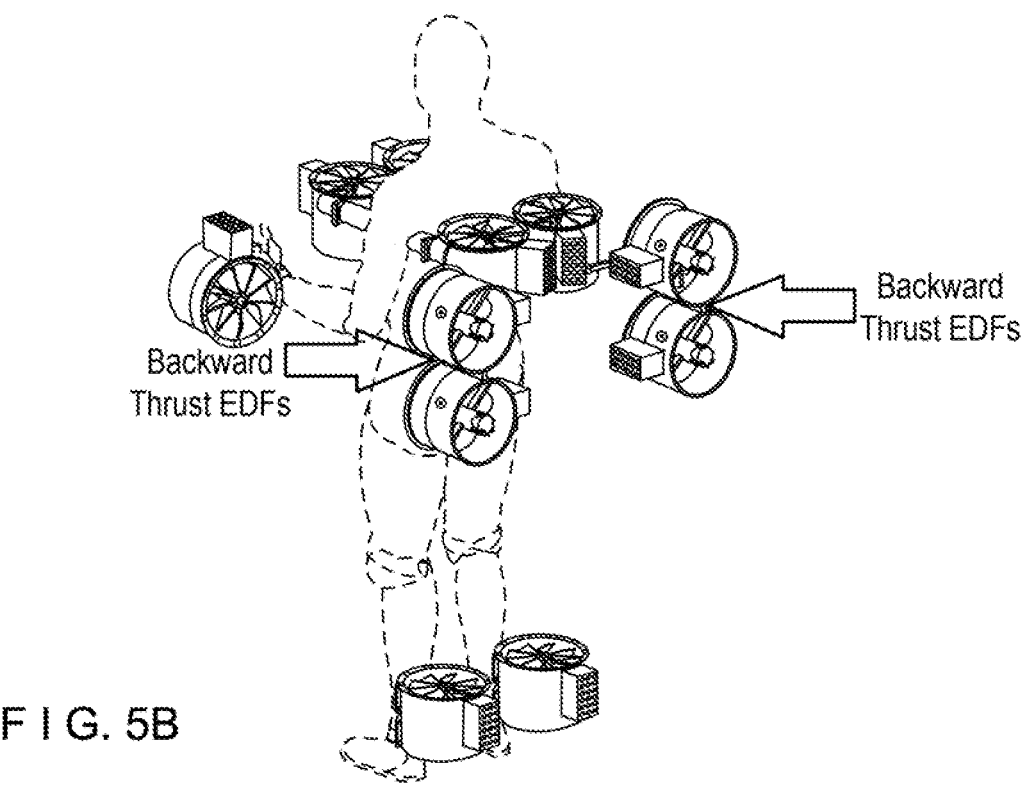
FIG. 5B is a rear perspective view of a flight system according to an exemplary embodiment.
Figure 22A:
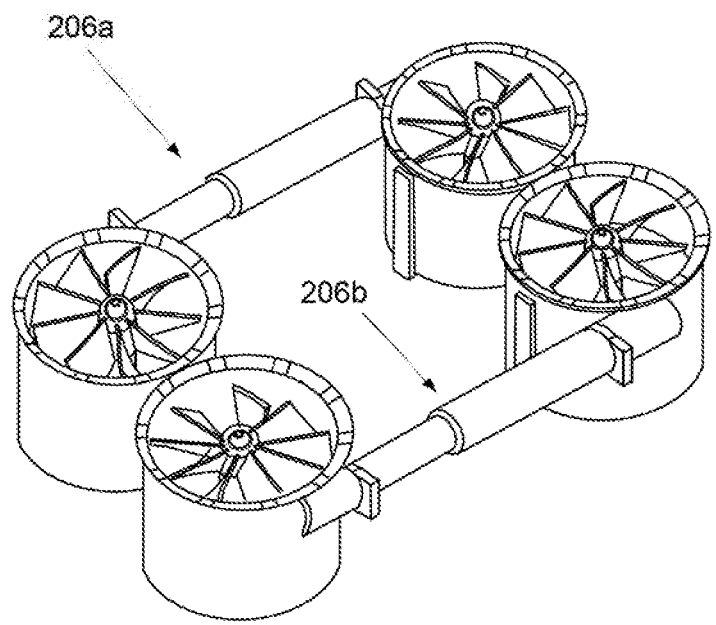
FIGS. 22A and 22B illustrate metal bars attached to EDFs that feed into each other according to an exemplary embodiment.
Figure 22B:
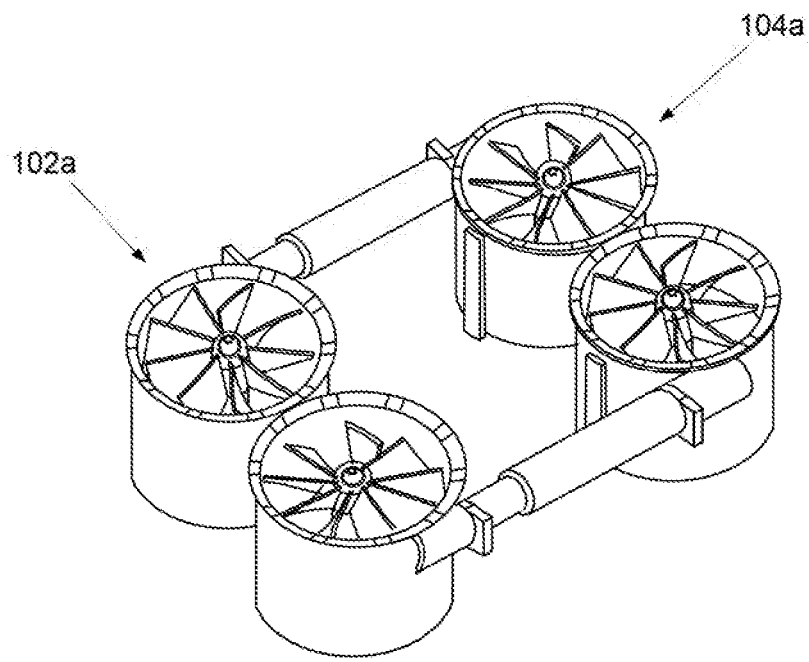

Referring to FIGS. 1 and 2, the Front and Back EDFs 102a, 102b, 104a, 104b (collectively "Torso EDFs") are attached to the torso of the user. The Front EDFs 102a, 102b rest securely and snugly on the user's chest. Parallel to the Front EDFs 102a, 102b, the Back EDFs 104a, 104b rest securely and snugly on the back of the user. The Torso EDFs 102a, 102b, 104a, 104b are connected via armpit supports 206a, 206b. Each of the armpit supports 206a, 206b may comprise a first bar and a second bar that feed into each other and rest under the user's armpits (where the user will feel lift) for adjustability. The first bar is inserted into a second bar and slidable between a predetermined positions within the second bar. The welding of the EDFs 102a, 102b, 104a, 104b and joining of them by the bars 206a, 206b, allows for a rigid structure, resulting in a better flight performance. The Torso EDFs 102a, 102b, 104a, 104b in the front will be connected to two bars 206a, 206b, one on the right 206a, and one on the left 206b. The Torso EDFs 102a, 102b, 104a, 104b in the back will also be connected to two bars 206a, 206b in this fashion. The bars 206a, 206b in the front and back slide into each other, allowing for the adjustability needed to create the perfect size for each user. See FIGS. 22A-B. For example, a large user would need the front and back Torso EDFs 102a, 102b, 104a, 104b to be far apart from each other (have a lot of space in between them). For a small user, the opposite would be true. These bars 206a, 206b allow for adjustability and rigidity before securing them in place via a strap. In other words, the metal bars 206a, 206b are of two sizes. One set of bars has an outer diameter that matches the inner diameter of the other set of bars. This allows the bars 206a, 206b to slide into one another, allowing for adjustability. The Torso EDFs 102a, 102b, 104a, 104b in the front and back can be moved closer to or further away from each other. In one embodiment, each of the armpit supports is cylindrical, an internal radius of a circular top of the first bar of each of the armpit supports is 0.80 inches, an external radius of a circular top of the first bar is 0.90 inches, and an internal radius of a circular top of the second bar of each of the armpit supports is 0.90 inches, and wherein an external radius of a circular top of the second bar is 1.00 inch. Preferably, a length of the first bar is 4.50 inches, a length of the second bar is 8.00 inches, and a length of each of the armpit support is adjustable between 8.00 inches and 13.50 inches.

On the outside of the bars 206a, 206b, strap hooks sit so that (once adjusting has occurred) the user can fix the distance between the Front EDFs 102a, 102b and Back EDFs 104a, 104b, resulting in the secure and snug fit mentioned above. Adjustable shoulder straps run from the intake end of the Back EDFs 104a, 104b and connect to the intake end of the Front EDFs 102a, 102b. This ensures that the Torso EDFs 102a, 102b, 104a, 104b do not fall to the user's feet. Collectively, these four EDFs 102a, 102b, 104a, 104b provide at least half of the thrust required to lift the user upwards.

Figure 6:
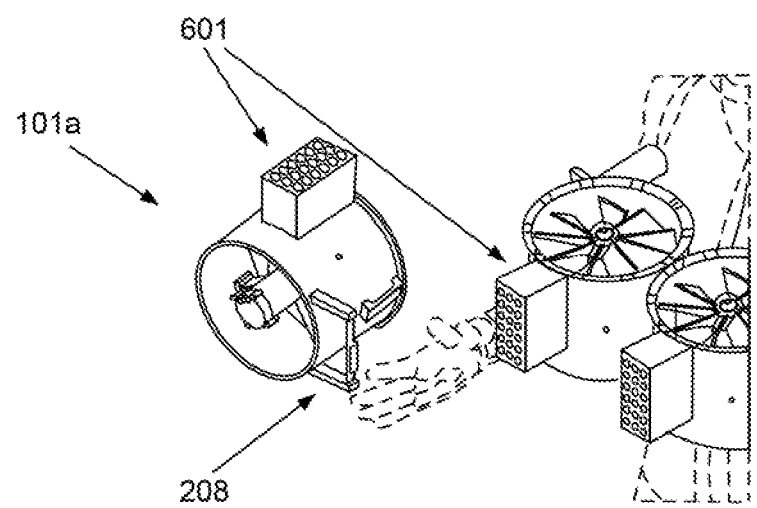
FIG. 6 is a close-up view of a wrist fan according to an exemplary embodiment.

Still referring to FIGS. 1 and 2, wrist straps and strap hooks secure the EDFs 101a, 101b ("Wrist EDFs") to respective wrists of the user. Leg straps secure the Leg EDFs 105a, 105b to respective legs of the user. Each of Wrist EDFs 101a, 101b is attached to each wrist of the user via a strap hook and a strap, securing the Wrist EDF 101a, 101b around the user's forearm(s). The Wrist EDFs 101a, 101b are strapped to each wrist of the user and held via a handle 208, which is attached to the fan, as shown in FIG. 6. The handle 208 on each Wrist EDF 101a, 101b allows the user to hold the remainder of the EDF weight, direct its thrust with ease, and pull at the control throttles (attached to the handles) as needed. The Wrist EDFs 101a, 101b can be used to create thrust in any direction. The user can use them for accelerating and decelerating in the forward, backward, upward, and downward directions. The Wrist EDT's 101a, 101b can also be used for directional (left-right) changes during flight at all times. The Wrist EDFs 101a, 101b are primarily responsible for allowing the user to slow down, stop, and help further stabilize flight (although stable flight may also be achieved without the need for wrist fans). Thus, a user can move wrist to create thrust at different angles.

Figure 23A:
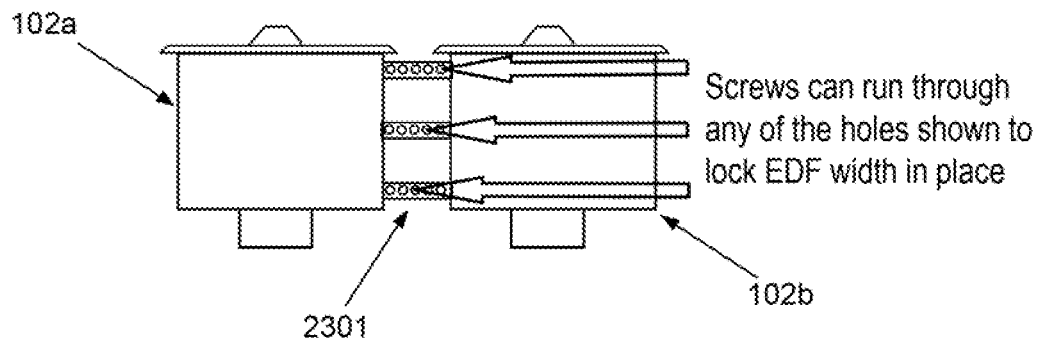
FIGS. 23A-C illustrate a width adjuster for adjusting a distance between EDFs in the front side of the torso of the user or a distance between EDFs in the back side of the torso of the user according to an exemplary embodiment.
Figure 23B:
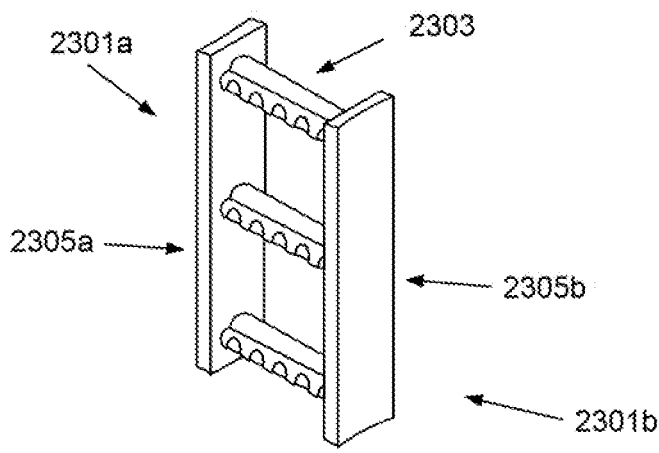
Figure 23C:
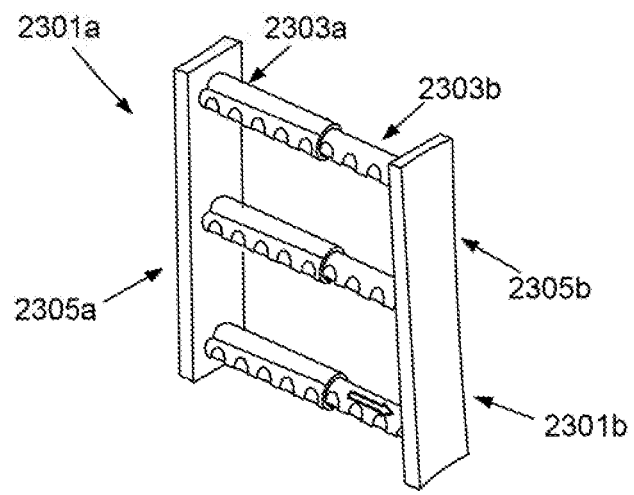

Referring to FIGS. 23A-C, there is seen an exemplary width adjuster 2301 that adjusts a distance between EDFs according to one embodiment. With the width adjuster 2301, the width of torso EDFs can be adjusted. For example, the Front EDFs 102a, 102b that are placed in the front side of the torso of the user or the Back EDFs 104a, 104b that are placed in the back side of the torso of the user may be connected via the width adjuster 2301. The width adjuster 2301 comprises a first unit 2301a and a second unit 2301b. The first unit 2301a comprises a bar 2303a with a plurality of holes and a plate 2305a. The second unit 2301b comprises a bar 2303b with a plurality of holes and a plate 2305b. Screws can run through one of the plurality of holes of the first unit 2301a and one of the plurality of holes of the second under 2301b that overlaps with that of the first unit 2031a in order to lock the width of the torso EDFs. The same mechanism can be applied to adjusting the length of the torso EDFs. The plates 2305a, 2305b may be welded or screwed to the Front EDFs 102a, 102b or the Back EDFs 104a, 104b. The bar 2303a of the first unit 2301a and the bar 2303b of the second unit 2301b have different diameter so the bars 2303a, 2303b are slidably fed into each other. FIG. 23B shows the width adjuster 2301 adjusted to have a short configuration. FIG. 23C shows the width adjuster 2301 adjusted to have a long configuration.

Figure 24A:
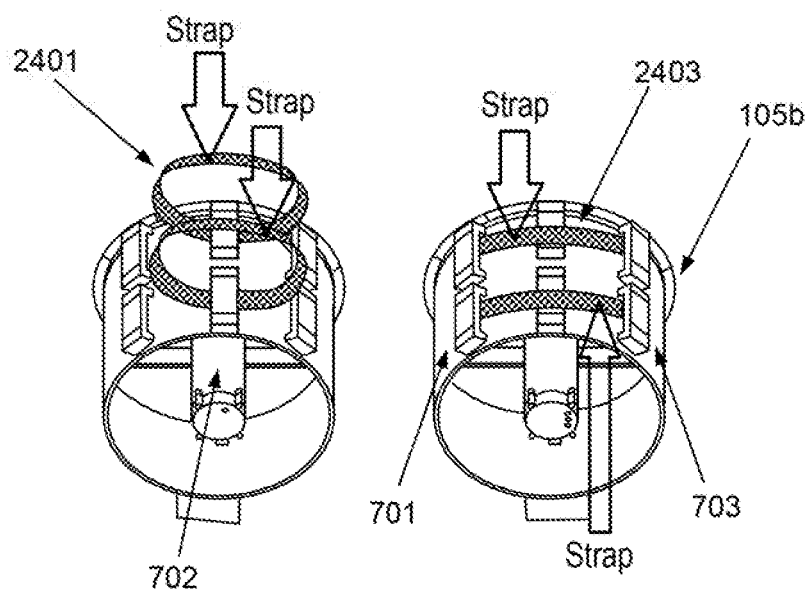
FIGS. 24A-B show straps for securing EDFs to the user's legs according to an exemplary embodiment.
Figure 24B:
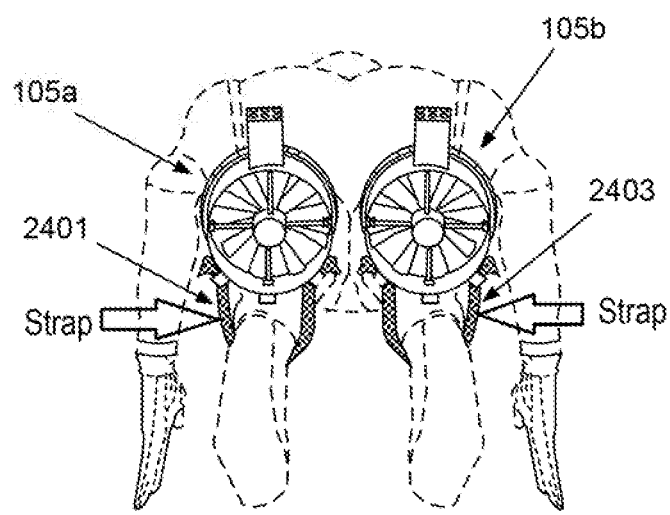

Referring to FIGS. 24A-B, there is seen exemplary straps for securing the Leg EDFs 105a, b to a user's legs. Leg straps comprise at least one first strap 2401 and at least one second strap 2403. The first strap 2401 is secured to a center hook 702. The second strap 2403 is secure to side hooks 701, 703. First, the user grabs the first strap 2401 that runs through the center hooks 702 and tightens/secures the strap on their shin. Commercially available securing means such as Velcro® may be used. Next, the user grabs the second strap that runs through the side hooks 701, 703 and tightens/secures it on his or her shin.

Figure 25A:
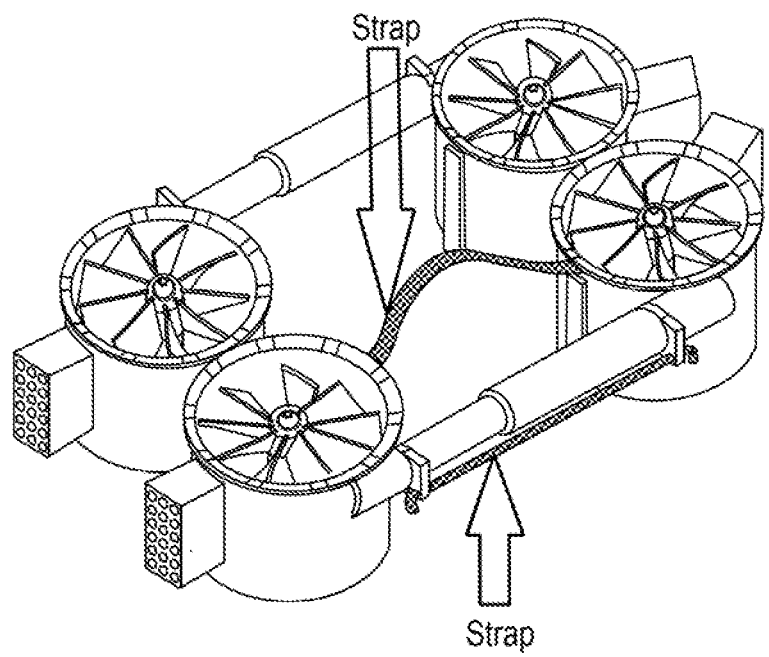
FIGS. 25A-B shows straps for securing EDFs to the user's torso according to an exemplary embodiment.
Figure 25B:
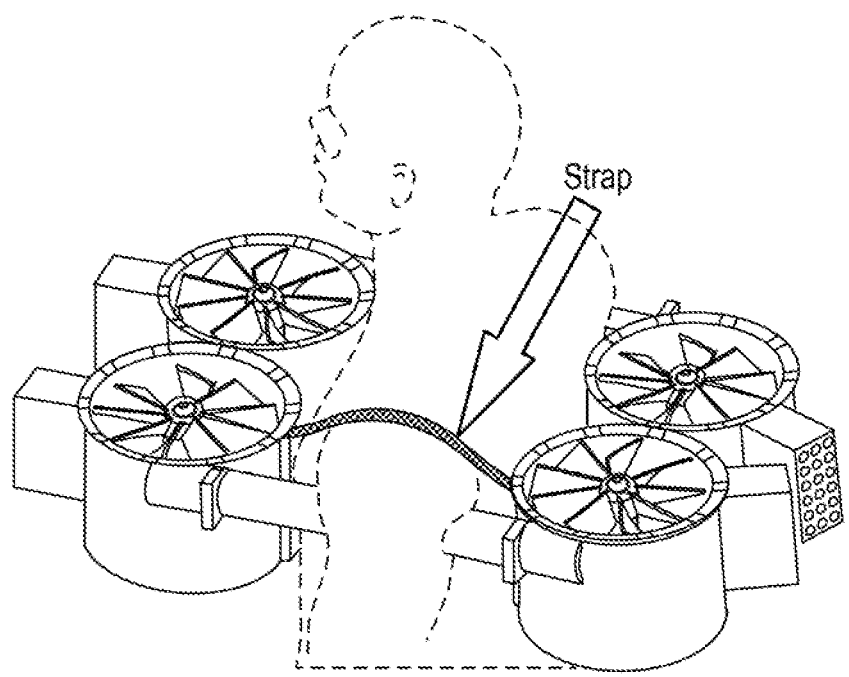

Referring to FIGS. 25A-B, there is seen exemplary straps for securing the Torso EDFs 102a, 102b, 104a, 104b to the user's torso. Adjustable shoulder straps run from the intake end of the Back EDFs 104a, 104b and connect to the intake end of the Front EDFs 102a, 102b. Once the metal bars have created the correct fit by sliding into each other, the strap secures the front and back EDFs by preventing them from sliding further way from each other.

Figure 26:
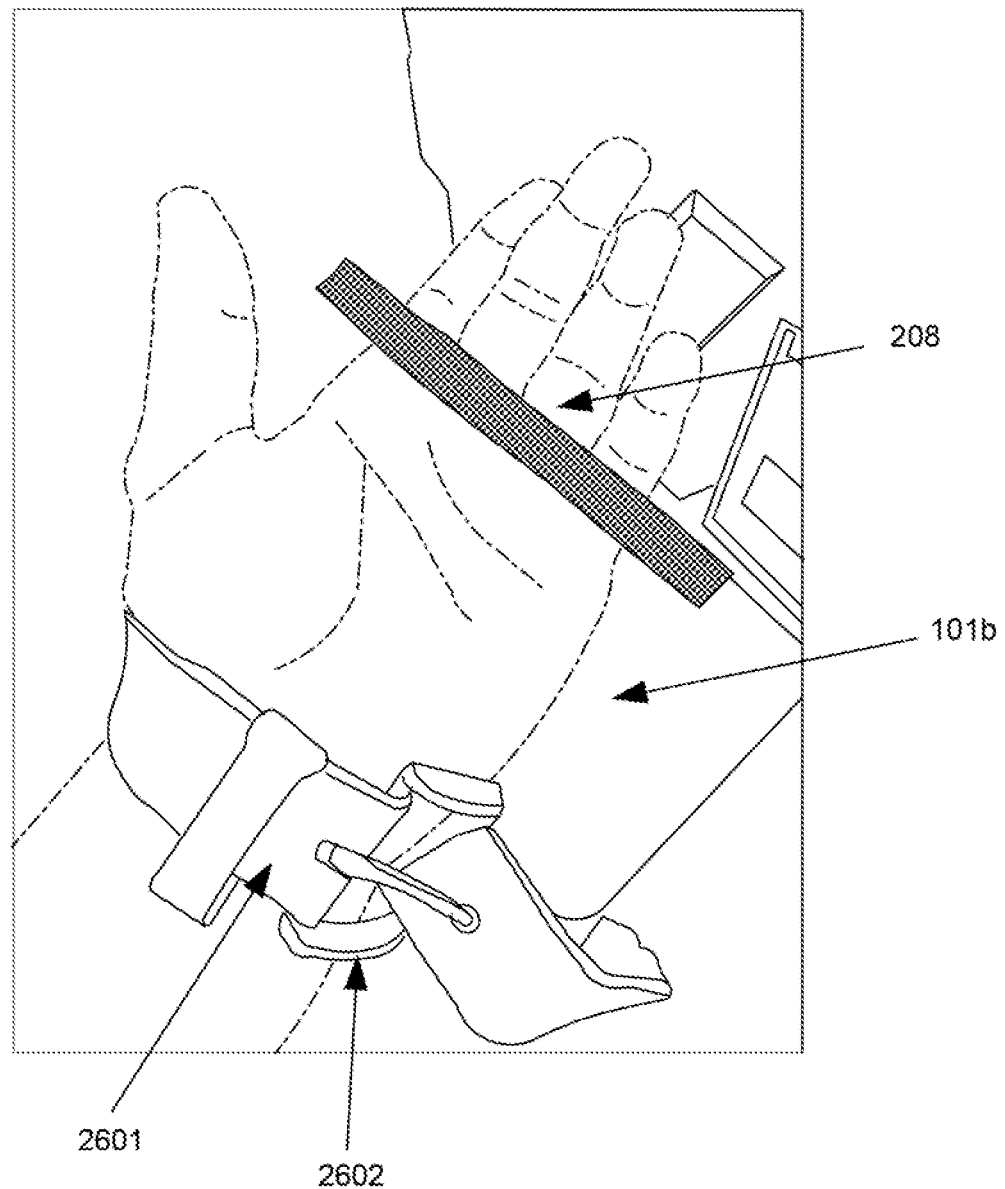
FIG. 26 shows straps for securing EDFs to the user's wrist according to an exemplary embodiment.

Referring to FIG. 26, there is seen exemplary straps for securing the Wrist EDFs 101a, 101b to the user's wrist. A strap 2601 is attached to each of the Wrist EDFs 101a, 101b and comprises a buckle 2602. A length of the strap 2601 is adjustable.

A different number of EDFs could be used instead of twelve (e.g., eight or ten EDFs). This can be done by eliminating two or four of the Backward Thrust EDFs 103a, 103b from the system with the twelve EDFs. With only two Backward Thrust EDFs 103a, 103b removed (ten EDFs total), a reduction in system weight would occur, but the maximum possible forward speed of the flight would be reduced. The second alternative is to remove all of the Backward Thrust EDFs 103 from the system using the twelve EDFs (eight EDFs total). Again, this would result in a reduction in system weight However, the maximum possible forward speed of the flight would be reduced. In this embodiment (eight EDFs total), the user would be moved forward by the Back EDFs 104a, 104b rotating faster than the Front EDFs 102a, 102b. This would create disproportionately high thrust coming from the user's back, tilting them at a forward angle, and thus causing them to move forward. This would require different flight and flight stabilization instructions than a system that has at least two Backward Thrust EDFs 103a, 103b.

The EDFs can communicate with each other via wireless communication devices or wires. Preferably, a small box welded to the side of each EDF contains a receiver, a microcontroller, an accelerometer, and a motor, which are wired or connected with each other. A combination of the components in the small box welded to each EDF and some components outside of the welded box, e.g., an encoder, may form a flight stabilization system.

Referring now to FIG. 6, there are seen EDFs with the small boxes 601 comprising one or more battery packs according to a preferred embodiment. In this embodiment, the system is 100% electric. Each of the twelve fans comprises a small box 601 comprising a battery pack and draws power from its own battery pack. Each battery pack can comprise unprotected, 18650 lithium ion battery cells. These cells are stacked in series and parallel to achieve the required voltage and capacity. They are then soldered onto a battery management system to protect them during charging. During flight the batteries will be inserted into the small box 601 attached to each fan.

Alternatively, 18650 lithium ion battery cells each have 3.7 volts and 3,500 mAh. They are stacked in series and parallel to create two (identical) larger batteries. Each of these batteries has 11.1 volts and 10,500 mAh. Once connected to the electronic speed control (ESC), these two batteries stack in series, resulting in 22.2 volts and 10,500 mAh. Different stacking configurations could be utilized. This would result in varying battery weight, RPMs, and flight times. In another embodiment, lithium polymer (LiPo) batteries by Traxxas® could be used in the flight system.

The energy density of lithium ion batteries is expected to increase significantly in the near future, Tesla® Model 3 features 2170 lithium ion cells. While these are slightly larger than 18650 lithium ion cells, the hold 30-50% more energy. Samsung® has unveiled their own version of these cells, 2170 lithium ion cells (or similar future improvements on lithium ion batteries) can be used in the system. This grants the user a dramatically increased flight time with little to no cost in system weight increases or performance decreases.

Battery life (and flight time by extension) is affected by a number of variables. These include, but are not limited to, the motor load (what the motor moves) and how many amps the motor draws over any given period of time (usually measured by the hour while operating at maximum voltage). There are also other variables such as the energy demands of the electronic speed control (ESC, receiver, flight stabilization system, etc.

The variables listed above relate to everything except for the batteries themselves. A battery's life is measured by its milliampere hour (mAh) rating. One amp hour is equal to 1,000 milliampere hours. The mAh rating of a battery and how many amps a motor draws over the course of an hour while operating at its maximum voltage can be used to approximately calculate the runtime of the system in question. For example, a motor that draws 100 amps per hour while operating at a maximum voltage of 10 volts will run for one hour when supplied with a ten volt battery with a 100,000 mAh rating.

There is a direct correlation between the volts utilized from a battery by a motor, and the operation time of that battery. The, fewer volts drawn from the battery by the motor, the longer the charge of the battery will last, regardless of its mAh rating. In one embodiment, when operating at 22.2 volts, the system consumes 80.4 amps per hour, per EDF, assuming the motor is the Leopard® 4082 1600 kv motor.

Figure 9A:
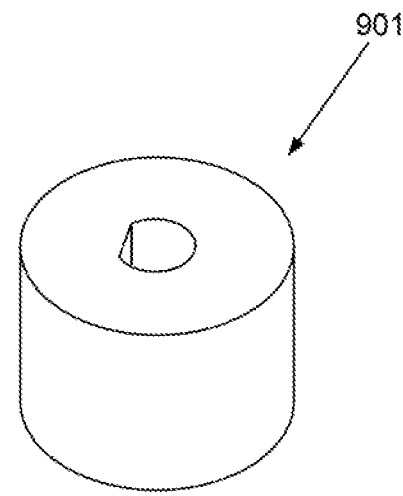
FIG. 9A illustrates a d-hole in a mount hub according to an exemplary embodiment.
Figure 9B:
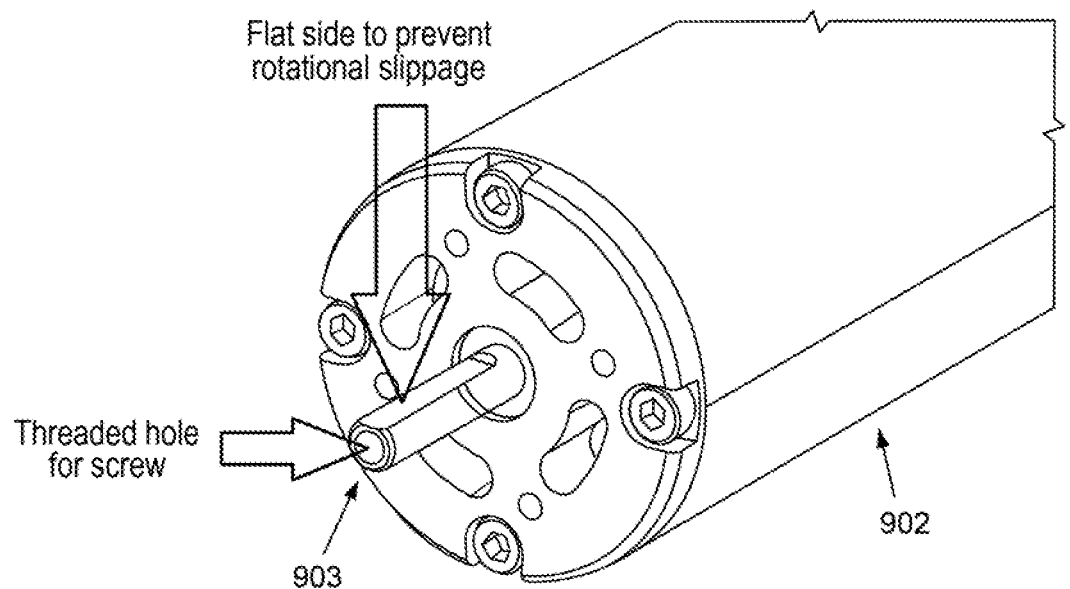
FIG. 9B illustrates a motor shaft having a flat side to prevent rotational slippage according an exemplary embodiment.
Figure 9C:
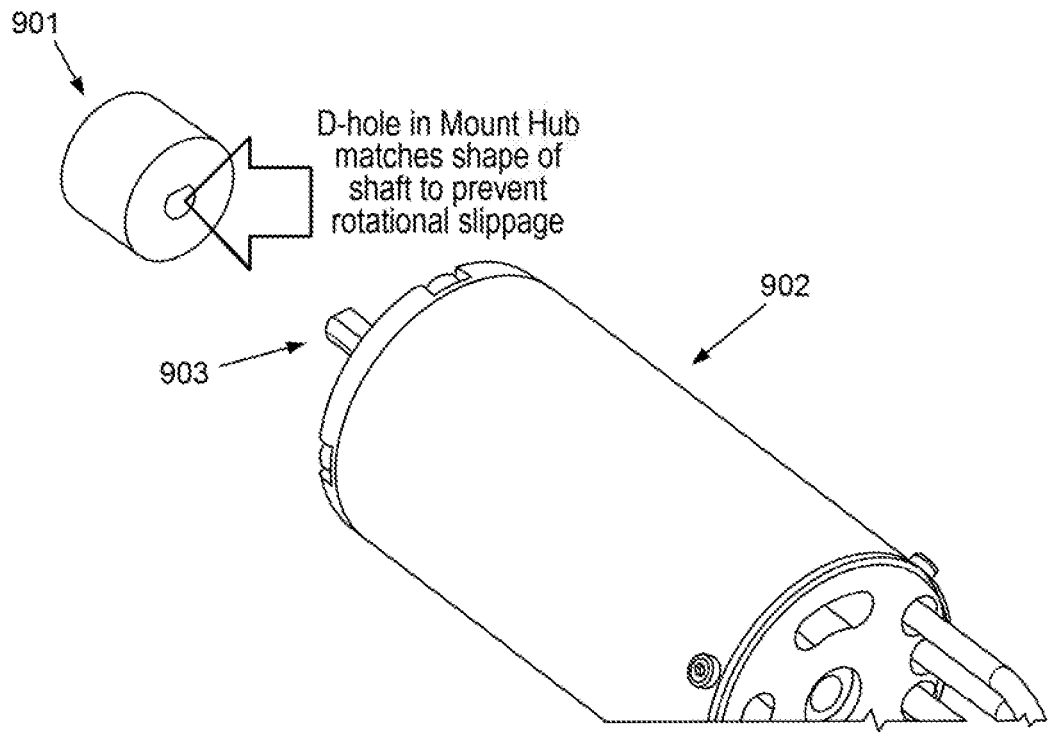
FIG. 9C illustrates a d-hole in a mount hub matching a shape of aa motor shaft according to an exemplary embodiment.

Referring to FIGS. 9A-C, there are seen a D-hole in a mount hub 901 and a motor 902 with a motor shaft 903 according to one embodiment. The shaft 903 has a flat side, which prevents the mount hub from slipping away from the shaft when rotating. Along the axis of the shaft 903, a hole is created and threaded for a screw to fit in. The D-hole in the mount hub 901 matches the shape of the shall 903 to prevent rotational slippage.

Figure 11:
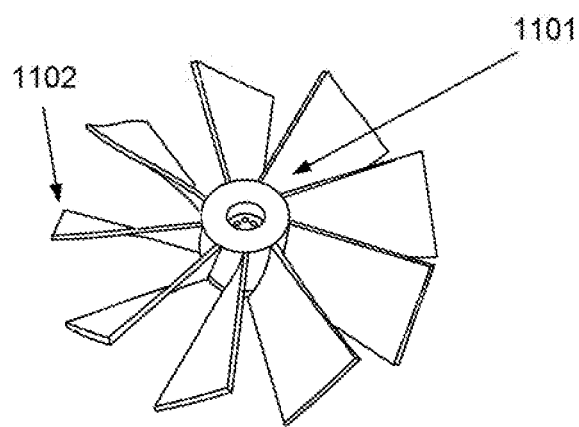
FIG. 11 illustrates a rear side of fan blades according to an exemplary embodiment.

Referring to FIG. 11, preferably the blade angle is greatest at the root 1101 of fan blades, gradually reduces as it gets closer to the tip 1102, and is least at the tip 1102. As the propeller spins around the crankshaft, the speed of the prop blades are highest at the tip 1102 and slowest at the root 1101. During one full rotation, the tip 1102 of the blade travels a much further distance than the blade root 1101, all in the same amount of time. The thrust created by the fan blades may be uniform across the blades because the angle of attack changes. According to one embodiment, the flight system comprises motors, electronic speed controls, receivers, transmitters, and materials for batteries, all of which are available on the market. Preferably, transmitters are dissected for their throttles and are attached to hydraulic springs and the wrist fan handles. However, the flight control/stabilization system may eliminate the need to use hydraulic springs. The fans comprise a motor casing, a duct, hooks for holding straps, a mounting hub, and a fan blade. Preferably the mounting huh is brazed to the motor shaft 903 and the fan blade is screwed onto the mounting hub with six titanium screws.

Alternatively, the motor 902 may have a tapped hole drilled into its shaft 903 from the top. The mount hub 901 may have a d-hole that fits perfectly with the shaft. A screw will then run through the mount hub 901 and into the motor shaft 903, securing the two together. The d-hole shape prevents rotational slippage and the screw prevents vertical slippage. The mount hub 901 and fan blade may be secured together with four screws. The screws may be made of non-titanium material such as stainless steel, brass, nickel alloys, aluminum alloy, etc.

Figure 14:
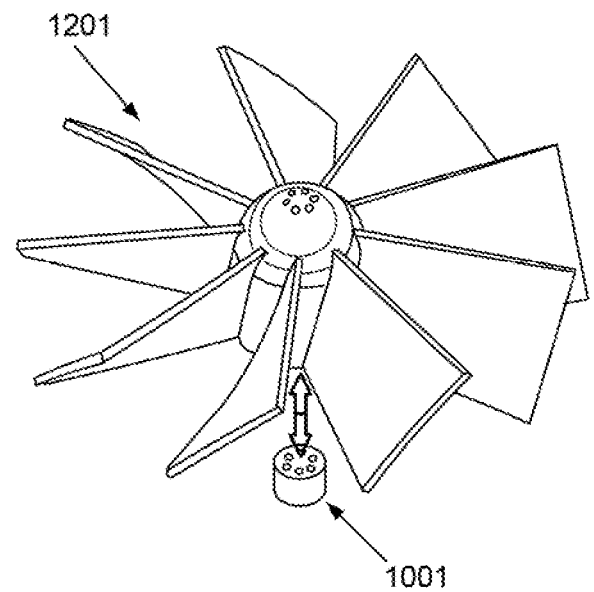
FIG. 14 illustrates an assembly of fan blades and a mount hub according to an exemplary embodiment.

Referring to FIG. 14, the fan 1201 gets screwed with the mounting hub 1001 that gets screwed over the motor, enclosing it entirely in the casing. The case can directs, concentrates, and increases thrust. Handles 208 have to be created for the wrist fans 101*a*, 101*b*. In still a preferred embodiment, all of the described parts for the fan is CNC (Computer Numeric Control) machined out of Aluminum 6061 (with the exception of the titanium screws). Preferably, all of these parts can be joined via screws, welding, or brazing.

In addition, EDFs for use in the invention are commercially available. By way of example, an EDF is available from Turbines RC® and sold under the trademark Schubeler® DS-215-DIA HST 195 mm Carbon EDF Ducted Fan. The Schubeler® 195 mm EDF can create up to 55 lbs of thrust.

Figure 16:
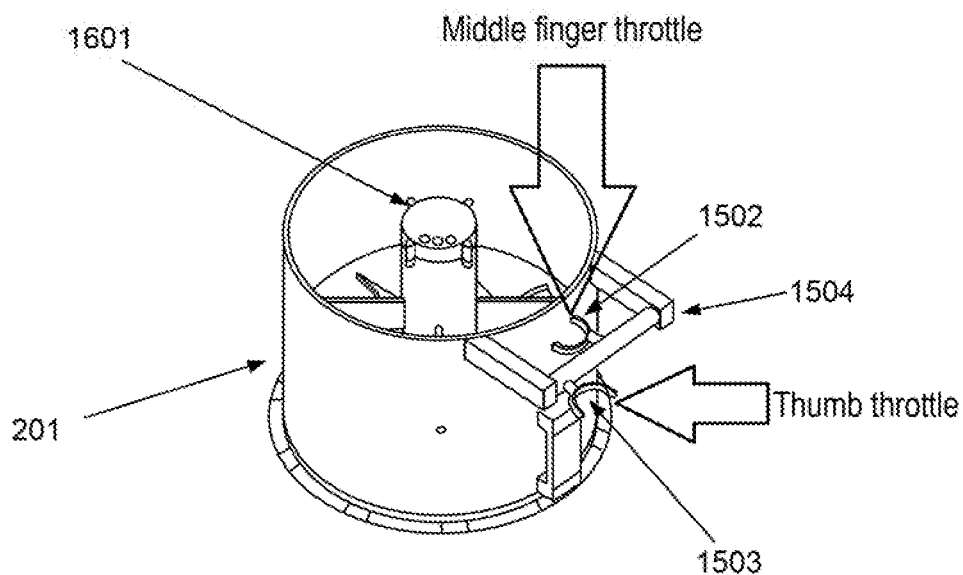
FIG. 16 is a front perspective view of a wrist fan according to an exemplary embodiment.
Figure 17:
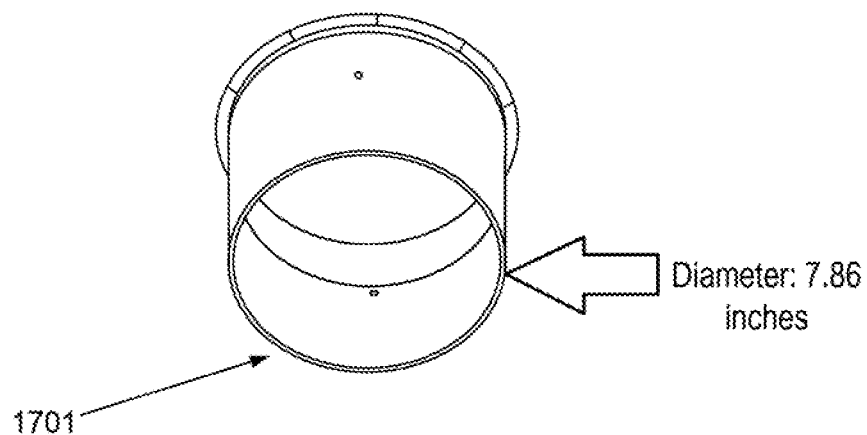
FIG. 17 is a bottom perspective view of a thrust tube according to an exemplary embodiment.
Figure 18:
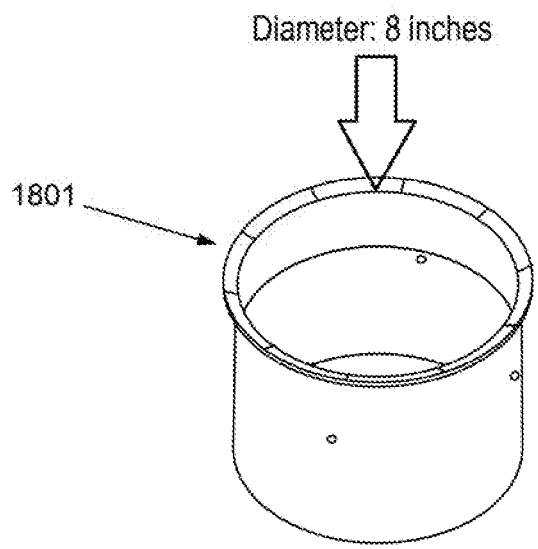
FIG. 18 is a top perspective view of the thrust tube shown in FIG. 17.
Figure 19:
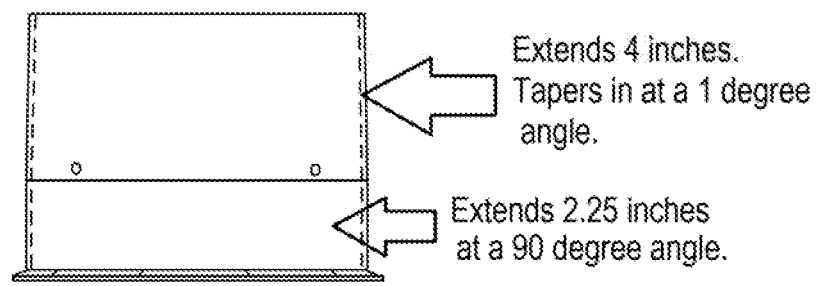
FIG. 19 is a side view of the thrust tube shown in FIG. 17.
Figure 20:
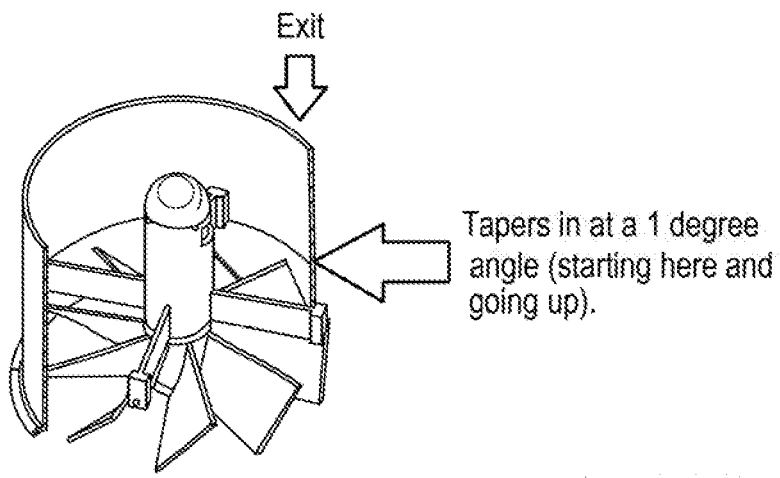
FIG. 20 is an exploded view of a fan according to an exemplary embodiment.

In a preferred embodiment, the system uses a motor with a 1,600 $K_V$ rating and consumes 22.2-29.6 volts of electricity, resulting in a 35,520-47,360 RPM range. The motor may be embedded in a portion 1601 of the fan, as shown in FIG. 16. When a motor with a different $K_V$ rating is used, the volts fed to the motor are changed to maintain the RPM range.

EDFs on the market often have mounting handles, stands, holes, etc, whereby a user can attach them to a remote controlled vehicle. In one aspect, the EDFs have handles 208 (in FIG. 2), strap hooks 701, 702, 703 (in FIG. 7), or other accessories welded to the outside of their cylinders so as to allow a user to fasten them to their body in the relevant areas.

EDFs the flight system require structural integrity so that they operate as designed without the components breaking or failing. This can be accomplished by:
1) Using only high quality materials, including aluminum 6061, carbon fiber, or high tensile strength plastics to build the EDF components.
2) Ensuring that motors used in the final designs are sturdy, reliable, and will not cease to operate when being used as intended.
3) Ensuring that all wiring, batteries, electronic speed controls (ESCs), receivers, etc. are designed with the utmost integrity and are secured in a reliable manner so as to prevent them from disconnecting during operation.

EDFs on the market generally have means of attaching the fan blade to the motor. These can include shaft adapters, screws utilizing pressure forces, push on caps, push on fan blades, etc.

Figure 10A:
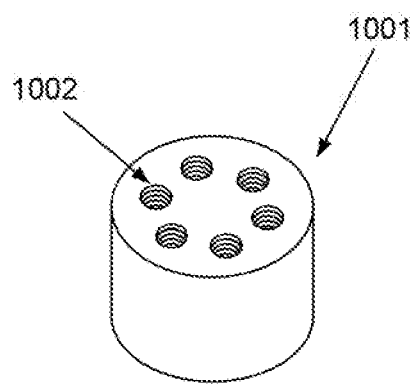
FIG. 10A illustrates a mount hub according to an exemplary embodiment.
Figure 10B:
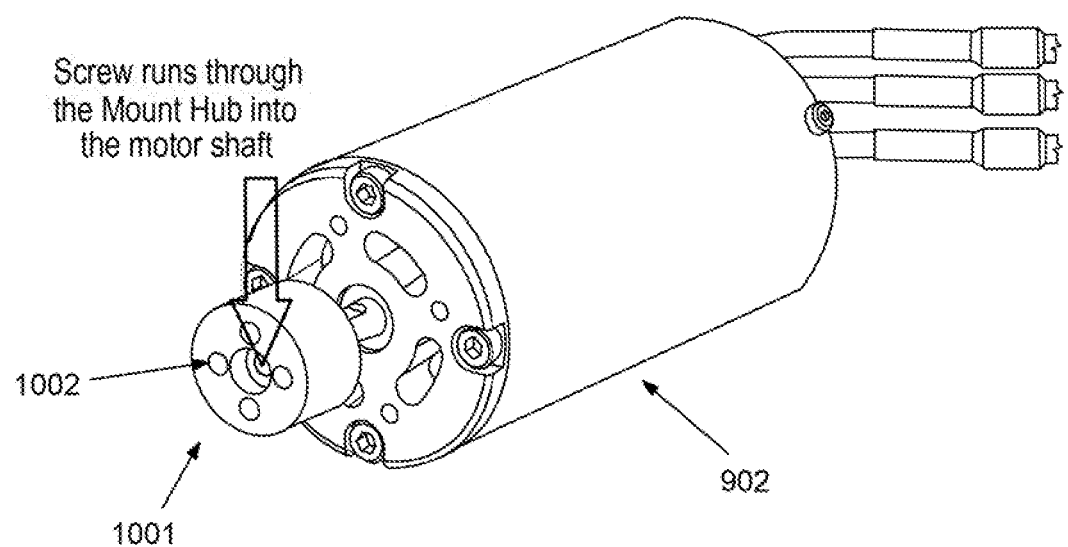
FIG. 10B illustrates a mount hub combined with a motor shaft according an exemplary embodiment.
Figure 12:
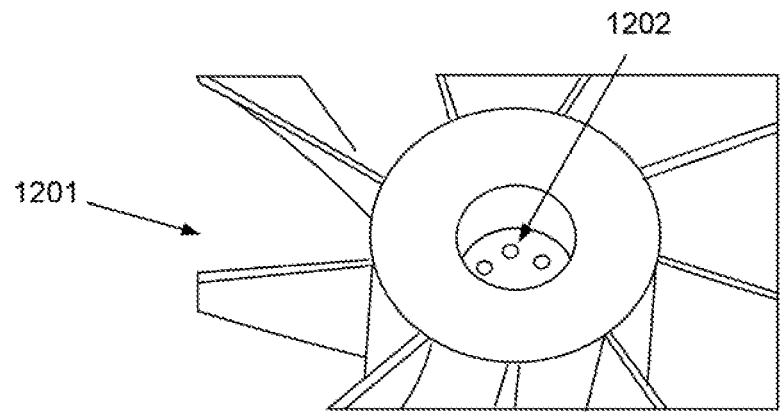
FIG. 12 is a close-up view of the fan blades shown in FIG. 11.
Figure 13:
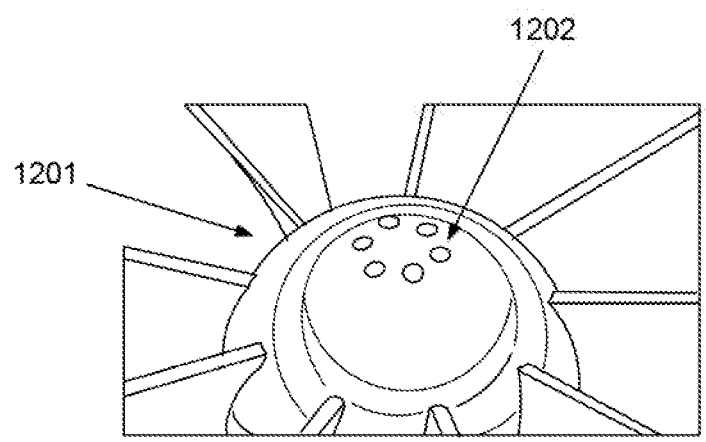
FIG. 13 illustrates a front side of the fan blades shown in FIG. 11.

FIGS. 10A-B and 12 show a preferred embodiment, in which a mount hub 1001 of the motor 902, which is welded or built onto the end of its shaft is shown. This mount hub 1001 may have a plurality of threaded holes 1002 (e.g., four or six threaded holes 1002). The mount hub 1001 may he attached to the motor shaft 903 with a screw, which runs through the mount hub 1002 into the motor shaft 903. The fan blade 1201 also has e.g., four or six threaded holes 1202 at its center matching the number of threaded holes 1002 in the mount hub 1001. The mount hub 1001 is placed on or into the fan blade 1201 and a steel screw (not shown) runs through each matching threaded hole, thus safely and reliably securing the fan blade to the motor. See FIG. 14.

If the user were split down the middle from the center of the top of their head to the ground, the EDF's could be categorized into those on the left half of the user's body, and those on the right half of the user's body. The EDFs in each of these categories will be perfect mirrors of one another. The EDFs on the left rotate in opposite directions to the EDFs on the right (e.g., clockwise and counter-clockwise). This prevents the flight system to yaw or roll left or right due to the centrifugal forces of the fans. This will help to stabilize user flight/hovering and help to prevent unintended user rotation while in the air.

Figure 15:
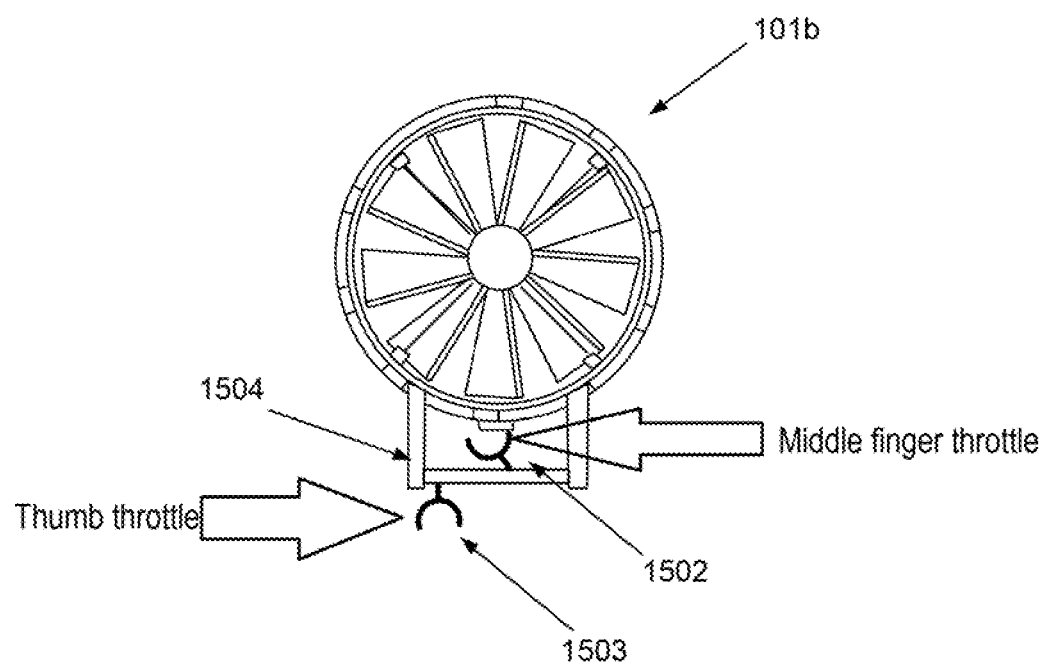
FIG. 15 illustrates a left wrist fan according to an exemplary embodiment.
Figure 27:
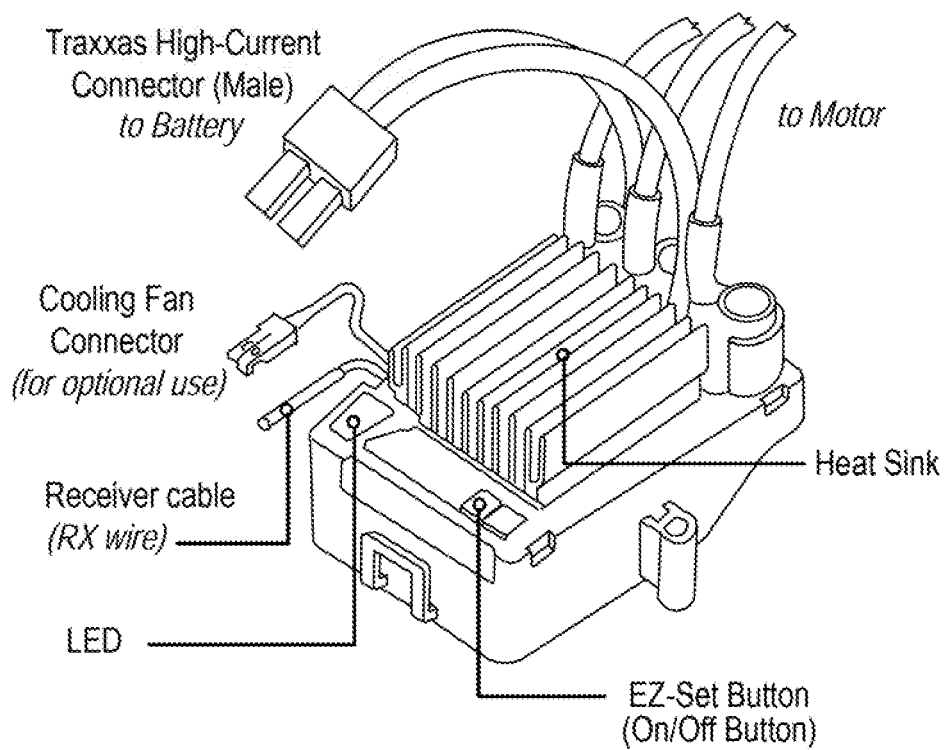
FIG. 27 shows a prior art electronic speed control.

Referring to FIG. 15, there is seen a left. Wrist EDF 101*b* with throttles 1502, 1503 located on the handle 1504 that the user can access via his or her fingers. The right Wrist EDF 101*a* is a minor image of the left Wrist EDF 101*b*. The throttles 1502, 1503 allow the user to control the rotations per minute of the fans, and by extension, the rate at which the fans accelerate/decelerate upward, downward, backward, and forward. They are able to do this as all of the fans are equipped with an electric speed control (ESC). An example'ESC is shown in FIG. 27. The throttles 1502, 1503 shown in FIG. 15 serve the exclusive purpose of giving a visual example. It should be noted that the figure(s) do not show necessary connections to an ESC, receiver, motor, etc., and that the components shown do not necessarily show the exact same size or angle thereof.

Referring to FIGS. 15 and 16, there is seen a wrist EDF 101*b* with throttles 1502, 1503 located on the handle 1504 that the user can access via his or her fingers. The six fans 102*a*, 102*b*, 104*a*, 104*b*, 105*a*, 105*b* are controlled by a throttle 1502 on the handle 1504 of e.g., the left wrist fan 101 that the user will access via his or her finger, e.g., his middle finger. In a preferred embodiment, the six fans 102*a*, 102*b*, 104*a*, 104*b*, 105*a*, 105*b* primarily responsible for moving the EMT upwards always all fire off simultaneously and always all are with the same rotations per minute. The four fans 103*a-d* are controlled by a throttle 1502 on the handle 1504 of e.g., the right wrist fan 101 that the user will access via his or her finger, e.g., his middle finger. The four fans 103*a-d* primarily responsible for moving the user forwards always all fire off simultaneously and always all are with the same rotations per minute. The wrist fans 101*a*, 101*b* each operate independently. They are controlled by their respective throttles 1503 that are placed on the wrist fans' handles 1504. The user can access each wrist fan throttle 1502 with his or her finger(s), e.g., his thumb.

Still referring to FIGS. 15 and 16, all throttles 1502, 1503 have built-in resistance. When the user pulls or pushes any of the throttles 1502, 1503 in an attempt to accelerate or decelerate in any direction, they will be met with resistance. This is to prevent the user from accelerating or decelerating too quickly which could result in injury or death. Preferably, this resistance is achieved by installing a small, hydraulic spring onto each throttle, ensuring user safety. Alternatively, the throttle resistance via hydraulic springs or any other means may be removed since the flight control/stabilization system can prevent abrupt accelerations or decelerations.

Referring to FIGS. 1 and 15, each Wrist EDF 101*a*, 101*b* is controlled by a throttle 1503 that the user may pull with the user's finger, e.g., his or her thumb. The more the user pulls down on the throttle 1503, the higher the RPMs. The less the user pulls down on the throttle 1503, the lower the RPMs. If the user lets go of the throttle, the RPMs return to zero. This throttle 1503 is not reversible. The left Wrist EDF is controlled by the user's left thumb. The right Wrist EDF is controlled by the user's right thumb. They primarily assist in breaking, reversing, and directional changes. Preferably, the Wrist EDFs 101*a*, 101*b* operate independently of each other, and all other EDFs in the system. They may not be part of the flight stabilization system. They may be controlled exclusively by their respective throttles and electronic speed controls (ESCs). The nature of control for the user would be identical to that of the Backward Thrust EDFs 103*a-d* according to the first set-up discussed above. While the Wrist EDFs 101*a*, 101*b* can create thrust in any direction, they may be primarily responsible for the user's decisions to turn, change direction(s), break, and move backwards. They can also be used to assist the user in ascending.

Referring to FIGS. 17-20, there are seen the thrust tube of the EDF according to one embodiment of the present invention. Because the flight system preferably uses ducted fans, controlling the air going into it and out of it is important. With the thrust tube containing and directing the thrust, and the fan efficiently moving the air the system has a very fast combination.

Because of the thrust tube's diameter reduction at the exit 1701, the air exits at a higher velocity than it entered the system. For example, the diameter of the exit 1701 of the fan may be 7.86 inches, while the diameter of the entrance 1801 of the thrust tube may be 8 inches. If the thrust is organized and directed, the air velocity increases because the air is funneled through a smaller, tighter thrust path. Unorganized and undirected thrust moves slower because it is the same amount of air moving through a much larger, loser thrust path.

There are ultimately two ways in which the flight control system could operate. These are a proactive flight system and reactive flight system. A proactive flight system has the advantage of being safer and having a smoother flight. The disadvantage of it is that the proactive flight system is more expensive and complex. A reactive flight system has inverse benefits and drawbacks to the proactive system.

In a proactive system, every EDF has an accelerometer attached to it. One master computer board has night instructions programmed into it and communicates with multiple slave boards. The slave boards may sit inside the small boxes that are welded to the EDFs. The master board may be placed anywhere on the flight system. The master board may be more powerful than the slave boards. The number of computer boards depends upon three variables: 1) how much computational power is required to carry out the demands of flight stabilization safety features, 2) how much computational power can fit into a board of a size that can be easily placed on an EDF, and 3) whether a proactive or reactive flight stabilization system is used. The proactive system can acquire the information of the location of every EDF relative to the others via microcontrollers and accelerometers. It can make predictions about movement and start stabilization before destabilizing forces occurred; hence the term "proactive" is used.

In a reactive system, there is one accelerometer on one of the torso EDFs. As the proactive system, the number of master/slave computer boards in the system depends on the computational power required to carry out the flight instructions of the flight system. The reactive system would require less computational power than the proactive system.

The vertical operation of the flight system will be explained below. The user's left middle finger can pull a throttle 1502 that causes the Torso and Leg EDFs to rotate simultaneously. This will lift the user upwards. Pushing this throttle 1502 in the reverse direction will allow the user to descend. The flight stabilization system will help the user maintain intuitive control as it relates to this throttle. When the user pulls the throttle 1502, the RPMs of the Torso and Leg EDFs 102*a*, 102*b*, 104*a*, 104*b*, 105*a*, 105*b* will increase by x% of their full speed, applying an upward force to the user. When the user lets it go, causing the throttle 1502 to rest in a default position, the RPMs will remain at x% of their full speed. This may cause the user to hover at their current altitude. This prevents the user from crashing to the ground should they stop paying attention and let go of the throttle 1502. When the user pulls at the throttle 1502 again, the RPMs will increase to x+% (i.e., greater than x%) of their full speed (causing the user to further ascend) until the user lets it again, at which point the EDFs will retain the RPMs they had at the point the user let it go again (causing them to hover at an increased altitude). For example, if they choose to pull the throttle 1502 at 20% this time, they will reach 30% RPMs (the original 10% plus the added 20%). If the user wishes to descend, they need only reverse this process. In some embodiments, the longer the user keeps the throttle 1502 in a pulled position, the more the EDFs' RPMs will increase.

To descend, the user pushes the throttle 1502 in the opposite direction. Descending may work exactly the same way as ascending; however, the user must push the throttle 1502 instead of pulling it. This causes gradual decreases in RPMs and thrust instead of increases (as above). There can be a limit to how many RPMs the user can slow the EDFs by per second. This ensures that they cannot descend at an unsafe velocity. As with increasing RPMs, when a user lets go of the throttle during a descent, it will remain in a neutral position, causing the EDFs to maintain the RPMs they had at the point the user let go of the throttle (allowing them to hover at their now decreased altitude).

The nature of user control in ascending and descending is the same. One difference is that there is a limit to the speed at which the user can descend, and there is no limit (beyond physics) to the speed at which the user can ascend.

The horizontal operation of the flight system with ten or twelve EDFs total will be explained below. The flight system has eight (8), ten (10), and twelve (12) EDF iterations. The ten EDF iteration is virtually identical to the twelve EDF iteration in terms of controlling the Backward Thrust EDFs 103*a-d*. However, the eight EDF iteration has no Backward Thrust EDFs 103*a-d*. Instead, the right middle-finger throttle 1502 would increase the RPMs of the torso EDFs on the user's back. This would create disproportionate thrust comings from the user's back, causing them to tilt forward, and thus, move forward. This kind of flight would be kept under control via the flight stabilization system and would require a slightly different set of flight instructions than the ten or twelve EDF iterations of the flight system.

In the flight system using ten or twelve EDFs total, the user's right middle finger can pull a throttle 1502 that causes the Backward Thrust EDFs 103*a-d* to rotate simultaneously. This would push the user forwards. Preferably, there are two ways that these EDFs could be set up as follows:

(1) Simplicity: In this configuration, the Backward Thrust EDFs 103*a-d* may be controlled exclusively by the throttle 1502 and electronic speed control (ESC). They do not interact with the flight stabilization system. When the user pulls the throttle x% of its full capacity, the Backward Thrust EDFs 103*a-d* would rotate at x% of their full capacity. When the user pulls the throttle 1503 at x+% of its full capacity, the Backward Thrust EDFs 103*a-d* would rotate at x+% of their full capacity. When the user lets go of the throttle 1503, the Backward Thrust EDFs 103*a-d* would cease to rotate. Pushing the throttle 1503 in the opposite direction would have the same effect as not pulling the throttle 1503, which is that the EDFs would cease to rotate.

(2) Complex: In embodiments having ten or twelve EDFs, the Backward Thrust EDFs 103*a-d* are controlled by the flight stabilization system. For example, the flight stabilization system may predict the effects of Backward Thrust EDFs and stabilize flight through the other EDFs accordingly. The Backward Thrust EDFs communicates with the flight stabilization system, telling it how many RPMs they are producing, how much thrust they are creating, etc. The flight stabilization system has different instructions programmed into it, allowing the user to tilt forward at an angle during forward acceleration. This could allow for increased speeds and improved aerodynamics. While the nature of control for the user is the same here as the simple scenario above, the outcome is different. When the user pulls the throttle 1502, they accelerate forward but in an increasingly forward tilted direction (limited by the flight stabilization system). Because this would change the direction of the thrust coming from various EDFs, the flight stabilization system is programmed with more complex flight instructions that allow for this kind of more sophisticated movement.

The horizontal operation of the flight system with eight EDFs will be explained below. In this embodiment, when the user pulls or pushes one of the throttles, the Back EDFs 104a, 104b rotates faster than the Front EDFs 102a, 102b. This would create disproportionately high thrust coming from the user's back, tilting them at a forward angle, and thus causing them to move forward. This would require different flight and flight stabilization instructions than a system that has at least two Backward Thrust EDFs 103a-d.

The flight stabilization system may be implemented in the flight system. An example of the operation of the flight stabilization system will be described below. The user is flying or hovering in the air. Some external force, such as winds, pushes the user from the back. Without the flight stabilization system, this might cause them to topple forward. With the flight stabilization system, the accelerometers would notice an angular change and send that message to the computer boards. The computer boards would have a pre-programmed set of flight instructions. These instructions would only allow for movement within certain parameters and at the instruction of the user. Once the computer board has been notified of the angular change, it will (in this case) cause the torso EDFs 102a, 102b, 104a, 104b on the user's chest to rotate more quickly (without new input from the user). This will create disproportionally more thrust at the front of the user's body, neutralizing the natural tendency to topple forward and maintaining an intuitive user flight experience.

The flight stabilization system prevents external forces such as the wind from blowing the user out of the sky. It helps the user maintain easy and intuitive control over his or her flight. The flight stabilization system also helps control the flight system when it accelerates and decelerates. This keeps the system at appropriate angles, preventing unintentional changes in the direction of thrust (and flight by extension).

The flight stabilization system may comprise at least one accelerometer and at least one computer board with programmed flight instructions. The computer board may be a microcontroller Arduino® board. An accelerometer is a device that measures changes in gravitational acceleration in a device it may be installed in. Accelerometers can measure acceleration, vibration, and the angle of an object relative to the surface of the Earth.

The accelerometer(s) communicates with the computer board(s). The computer board(s) communicates with the relevant EDF(s). The most relevant EDFs are the Torso EDFs 102a, 102b, 104a, 104b. It may be useful (but not necessary) to integrate other EDFs such as the Backward Thrust EDFs 103a-d with the flight stabilization system. This could allow for angular changes during flight that would allow for faster movement (especially in the forward direction) via less air resistance and better aerodynamics, while maintaining easy and intuitive user control. There are multiple combinations for flight stabilization that could be used in the flight system as follows.

A flight stabilization system may be installed with ten (10) or twelve (12) EDFs total. For example, a user is hovering and decides to move forward. He or she pulls a relevant throttle 1502, 1503, and the Backward Thrust EDFs 103a-d generate thrust and cause the user to move forward. Because the majority of the thrust keeping the user up (the thrust from the Torso EDFs 102a, 102b, 104a, 104b) is above the user's center of gravity, the backward thrust generated from the Backward Thrust EDFs 103a,d would cause the user to tilt forwards. Now that the user is tilted forwards, the Torso EDFs are no longer generating thrust up at a 90 degree angle (vertical to the ground), but at an angle between 90 degrees and 180 degrees (horizontal to the ground). Additionally, the Backward Thrust EDFs 103a-d are now no longer generating thrust straight backwards, but at an angle closer to 90 degrees, as they have tilted with the user. Now the Torso EDFs 102a, 102b, 104a, 104b are contributing to backward thrust in addition to downward thrust, The Backward Thrust EDFs 103a-d are now contributing to backward thrust as well as upward thrust (pushing the user down). Flight stabilization system corrects for this kind of problem. The accelerometers recognize the angular changes of the EDFs and communicate with the computer boards. The computer boards then automatically adjust the RPMs of the relevant EDFs to stabilize the flight based on the instructions programmed into the computer boards. For example, when the user starts to tilt forward because a gust of wind hits the user's back, and the flight stabilization system automatically increases the RPMs of the Torso EDFs in the front. This creates disproportionate thrust at the front of the user's body, keeping him or her in the upright position. This is how a user will maintain easy and intuitive control over their flight, in another preferred embodiment, Arduino® Computer Boards are used for flight stabilization.

The flight system comprises safety features as safety will be an important part of the flight system. However, there is a tension between safety as the primary goal, and minimalism in terms of size, weight, and simplicity, as a secondary goal. As with any system, the more components that are added to it, the more it weighs. In the case of flight systems, this takes away from fight time and performance. Thus, there should be a balance between maximizing user safety and maximizing system performance.

Figure 21:
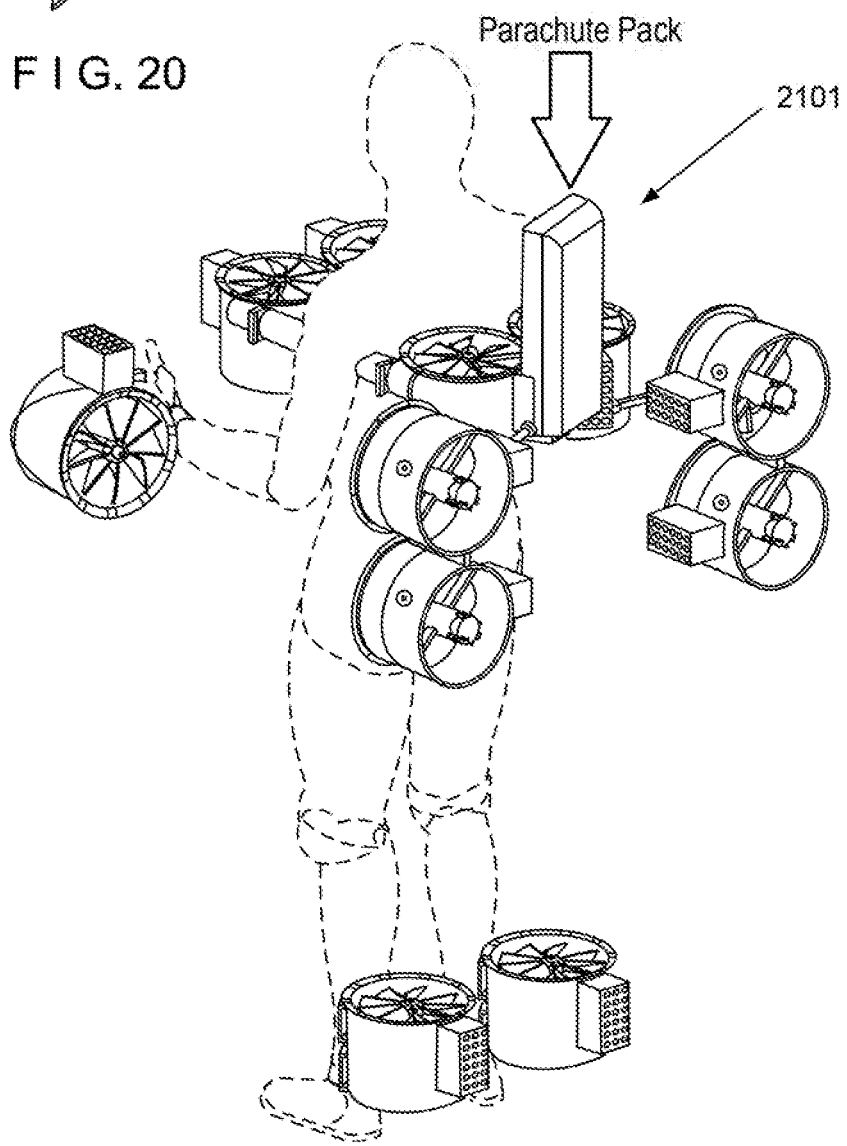
FIG. 21 is a rear perspective view of a flight system having a parachute pack according to an exemplary embodiment.

Referring to FIG. 21, there is seen a flight system with a parachute pack 2101 according to one embodiment of the invention. There are several options when it comes to safety features. In one embodiment, a parachute that could be deployed from a low altitude (e.g., 700 feet) could be used in the event of a system failure. A parachute that could be deployed from a low altitude could be installed as the parachute pack 2101 near the user's back. The parachute can be packed into a hardened case or a soft backpack. The parachute pack 2101 is attached to the EDFs 103a-d on the user's back. In some ways, this would he similar to the ballistic parachute used in Martin Jetpack®. In the event of a total system failure, the user could deploy the parachute and land safely from a minimum altitude of approximately twenty feet.

The flight stabilization system can also act as a safety feature. By definition, it stabilizes the flight. The flight stabilization system can also limit the velocity at which a user can decrease his or her altitude. This will prevent them from making a fatal fall. In yet another embodiment, the system monitors battery power levels and altitude and ensures that the user can never reach an altitude that they could not safely return to the ground from at a safe velocity, with their current battery power levels. For example, when a user pulls one or more of four throttles, the flight system moves up, down, forwards, backwards, and/or any sideway direction. The electronic speed control (ESC) controls how many volts the motor receives from one or more batteries at any given time. This is based on how much and how long the user pulls on the throttle for. The more throttle pull, the more volts received by the battery, and thus higher RPMs and greater thrust.

When the user is in the air, either moving or hovering, they are virtually weightless. This is because the force with which gravity is pulling them towards the Earth is being at least matched by the flight system. Added to this, the fact that nothing is holding them to the ground (as feet would do if one were merely standing), remaining stable during flight requires the integration of hardware and software.

In still another embodiment, a forced landing feature is installed. In this embodiment, the flight system comprises a battery power level and altitude monitoring system. With a forced landing feature, the flight system would automatically land the user at a safe velocity if their battery power levels were too low and/or their altitude was too high. This would prevent a user from running out of power mid-flight and falling.

Batteries can be looked at and understood in many ways. One important part of understanding batteries, is understanding the state of charge (SOC). This is the equivalent of a fuel gauge for the battery pack in a battery electric vehicle. Measuring techniques such as direct measurement, SOC from specific gravity measurement, voltage-based SOC estimation, current-based SOC estimation, SOC estimation from internal impedance measurements, or any other SOC measuring technique may be used. The flight system may comprise a monitoring system for SOC that notifies the user when the batteries are running low.

In another aspect, the flight system comprises a low battery auto landing system. This safety feature would be similar to the low battery warning described above. However, it would come with an added safety feature. Instead of only notifying the user when the battery gets too low, the state of charge monitoring system would interface with the computer boards responsible for flight instructions. This would ensure that the user could 1) never fly to an altitude from which they could not safely land with their current SOC and 2) forcibly land the user if they were too high with a low SOC.

It is possible to install multiple accelerometers, microcontrollers, or other components such that when one of them fails, another could immediately take over for it.

In a preferred embodiment, an anti-collision system is built into the system. This would automatically redirect the path of a user's flight away from incoming objects. This would help the user avoid crashes into other flyers or objects that they might not have seen or had time to respond to on their own. Anti-collision systems are becoming commonplace in everyday consumer life, thanks to the ever evolving auto-industry. Technology such as cameras, lasers, and radar are integrated with computers to monitor the surrounding environment for street signs, pedestrians, and other vehicles. They can take corrective action accordingly. This corrective action can include warnings to the driver or even hitting the breaks without input from the driver.

The anti-collision system can be implemented in the flight system in two ways.

1) Anti-collision system: Cameras, lasers, and/or radar could be installed into the tight system that could monitor the surrounding environment for other users, buildings, birds, bridges, etc. Similarly to cars, the anti-collision system would talk to computer boards that would automatically change the rotational speed of the relevant EDFs needed to move the user out of the way of danger. This could be done without input from the user. They could avoid a collision that they did not see coming.

2) Using improvements made to the technologies mentioned above, combined with GPS, a user could enter their desired destination into the flight system and be flown there without needing to give any input during flight. To achieve this, some minor modifications can be made in EDF placement, computer board changes/modifications, etc.

The flight system can vertically accelerate at a rate of 10 MPH/second. The system can be controlled to produce a vertical thrust $F_y$ as follows:

$$a_y = \frac{10 \text{ MPH}}{\text{s}} = \frac{10 \cdot \text{mile}}{\text{H} \cdot \text{s}} \times \frac{5280 \text{ ft}}{\text{mile}} \times \frac{1 \text{ Hr}}{3600 \text{ s}} \cong 14.67 \frac{\text{ft}}{\text{s}^2}$$

where $\alpha_y$ is a vertical acceleration of the system $F_y$ can be written as:

$$F_y = m(\alpha_y + g)$$

where g is the acceleration of the gravity of Earth and in is the mass of the system and the user. Thus, we can have Equation 1 as follows:

$$F_y = m \times \left(\frac{14.67 \text{ ft}}{s^2} + \frac{32.174 \text{ ft}}{s^2}\right) = m \times \frac{46.844 \cdot \text{ft}}{s^2}. \quad \text{Equation 1}$$

$F_y$ is a force required to accelerate the system at a rate of 30 MPH in three seconds moving up against gravity. Thus, the system can be controlled to produce a vertical thrust according Equation 1 to generate a vertical acceleration of 10 MPH/second.

For example, assuming m=200 lbs, then:

$$F_y = 200 \text{ lbs} \times \left(\frac{14.67 \text{ ft}}{s^2} + \frac{32.174 \text{ ft}}{s^2}\right) = 9368.8 \frac{\text{lb} \cdot \text{ft}}{s^2}$$

$$1 \text{ lbf} \cong 32.174 \times \frac{\text{lb} \cdot \text{ft}}{s^2}$$

$$F_y = 9368.8 \times \frac{1 \text{ lb} \cdot \text{ft}}{s^2} \cdot \frac{1 \text{ lbf}}{32.174 \times \frac{\text{ft} \cdot \text{lb}}{s^2}} \cong 291.19 \text{ lbf}.$$

Thus, the system can be configured to produce at least a vertical thrust of 291.19 lbf to be able to vertically accelerate at 10 MPH/second.

The flight system can horizontally accelerate at a rate of 20 MPH/second. The system can be controlled to produce a vertical thrust $F_x$ as follows:

$$a_x = \frac{20 \text{ MPH}}{\text{s}} = \frac{20 \text{ MPH}}{\text{s}} \times \frac{5280 \text{ ft}}{\text{mile}} \times \frac{1 \text{ Hr}}{3600 \text{ s}} \cong 29.333 \frac{\text{ft}}{s^2}$$

where $α_x$ is a horizontal acceleration of the system. The vertical thrust $F_x$ can be written as follows:

$$F_x = m \cdot a_x = 29.333 \times \frac{m \cdot \text{ft}}{s^2}. \quad \text{Equation 2}$$

$F_x$ is a force required to horizontally accelerate the system at a rate of 60 MPH three seconds. Thus, the system can be controlled to produce a horizontal thrust according to Equation 2 to generate a horizontal acceleration of 20 MPH/second.

For example, assuming m=200 lbs, then:

$$F_x = 5866.66 \times \frac{\text{lb} \cdot \text{ft}}{s^2}$$

$$1 \text{ lbf} \cong 32.174 \times \frac{\text{lb} \cdot \text{ft}}{s^2}$$

$$F_x = 5866.66 \times \frac{\text{lb} \cdot \text{ft}}{s^2} \times \frac{1 \text{ lbf}}{32.174} \cong 182.34 \text{ lbf}.$$

Thus, the system can be configured to produce at least a horizontal thrust of 182.34 lbf to be able to vertically accelerate at 20 MPH/second.

One of the advantages of the present invention is that it can achieve a top forward speed of at least 60 MPH in 3 seconds and an upward speed of 30 MPH in at least 3 seconds. It is capable of operating from 0-1,000 feet high and could serve as an alternative mode of transportation for cars, buses, and trains.

It is noted that the equations above are approximations. They assume that the combined weight of the user, their clothes, and the system according to one embodiment may be 200 lbs. The equations above do Pot account for air resistance. If they did, more thrust would be required than is stated above to reach desired acceleration/speed. However, the flight system according to one embodiment will be able to create far more thrust than is needed to meet the desired acceleration/speed. Therefore, these equations should not be thought of as conservative estimates, but more appropriately as approximations.

An electronic speed control (ESC) is used, to control the RPMs of a motor. By extension, this controls the thrust of the EDF(s). The ESC, motor, batteries, receiver, and flight stabilization system are all connected to one another. The ESC controls the RPMs of the motor by controlling the volts delivered to the motor at any given time.

All motors have a $K_V$ rating. A $K_V$ mating is the number of RPMs a motor will achieve when given one volt of electricity. For example, a motor with a $K_V$ rating of 1,600 RPM/V will achieve 3,200 rpms when given 2 volts of electricity (1600 $K_V \times 2$ volts=3200 RPMs).

In a preferred embodiment, when the users pulls the throttle 1502, 1503, the ESC allows the battery to feed the motor x% of its maximum voltage. When the user pulls the throttle a little bit more, the ESC allows the battery to feed the motor x+% of its maximum voltage. When the user pulls the throttle all the way, the ESC allows the battery to feed the motor 100% of its maximum voltage.

Each motor has one or more encoders that measure the RPMs of the motor. If the RMPs of the motor less than its optimal RPMS, the encoder communicate with the computer boards, which would communicate with the ESC to provide the motor with more volts from the battery. This ensures that all motors are performing equally to one another, which is critical for flight stabilization.

The RPMs that can he utilized are not limited to three fixed numbers (as above) but may be (theoretically) between 0 RPMs and 1600×x volts=y RPMs, inclusive.

In another embodiment, an accelerometer, a computer board, and a motor are configured to perform automatic angular change so that they keep backward thrust EDFs horizontal to Earth's surface regardless of user angle or other EDF angles. This allows backward thrust EDFs to contribute all of their power towards forward movement, unlike the previous iteration where they might have a tendency to push the user downwards when the thrust angle of the backward thrust. EDFs changes from being just backwards to being backwards and upwards. Automatic angular adjustment corrects this and could be useful on the 10 EDF and the 12 EDF iterations.

Figure 28:
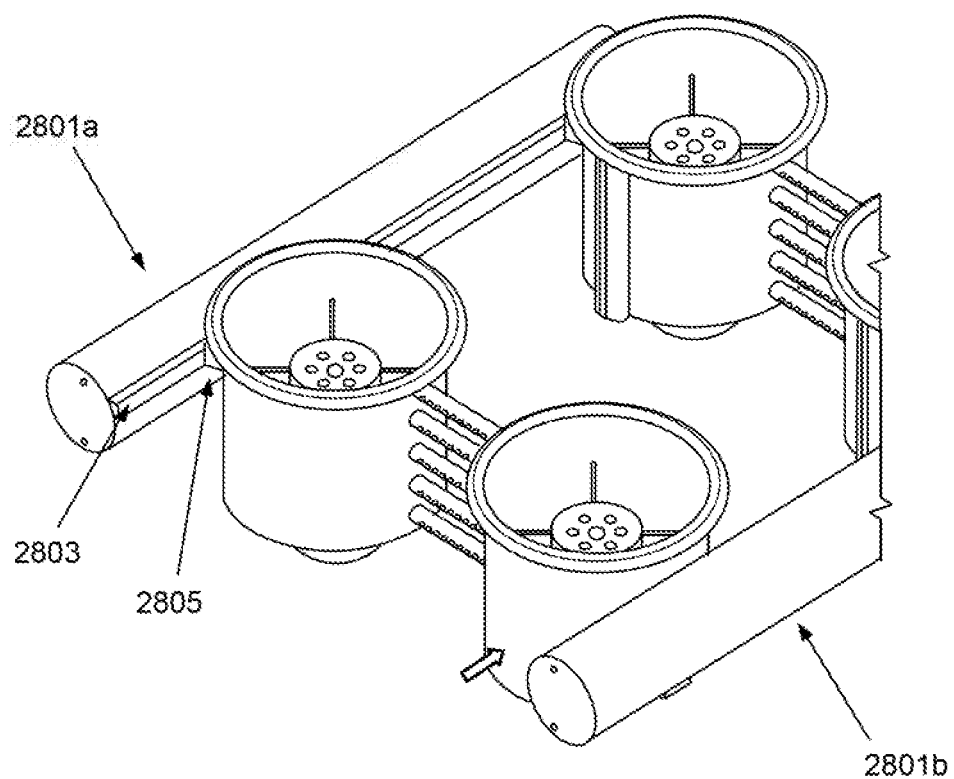
FIG. 28 shows four torso EDFs slidably attached to a pair of armpit supports according to an exemplary embodiment.

Referring to FIG. 28, there is seen four torso EDFs slidably attached to a pair of armpit supports 2801a, b according to another embodiment. In this embodiment, a torso EDF is slidably locked with a longitudinal space of an armpit support 2801a, 2801b. The armpit support 2801a, 2801b comprises a longitudinal opening 2803 on one side. An outer part of the longitudinal opening 2803 is narrower than an inner part of the longitudinal opening 2803 such that a male connector 2805 attached to a torso EDF is slidably attached to the armpit support 2801a. With this configuration, a length of the four torso EDFs can be adjusted.

The flight system according to one embodiment qualifies as an ultralight aircraft under Part 103 of Federal Aviation Regulation (FAR). In this embodiment, the flight system is used for manned operation in the air by a single occupant and for recreational or sport use only. The system may weigh less than two hundred fifty-four (254) pounds and its fuel capacity may not exceed five (5) gallons. Alternatively, the system only uses batteries. in addition, the system may be configured not to exceed an airspeed of fifty-five (55) knots and a power-off stall speed of twenty-four (24) knots.

The present invention has been particularly shown and described with respect to certain preferred embodiments and specific features thereof. However, it is noted that the above-described embodiments are intended to describe the principle of the invention, not limit its scope. Therefore, as is readily apparent to those of ordinary skill in the art, various changes and modifications in form and detail may be made without departing from the spirit and scope of the invention as set forth in the appended claims. Other embodiments and variations to the depicted embodiments will be apparent to those skilled in the art and may be made without departing from the spirit and scope of the invention as defined in the following claims. Also, reference in the claims to an element in the singular is not intended to mean "one and only one" unless explicitly stated, but rather "one or more."

What is claimed is:

1. A flight system for an individual user, comprising
   at least eight (8) electric ducted fans (EDFs), each of the at least eight (8) EDFs comprising a plurality of blades, a motor and an electronic speed control unit that controls a speed of rotation of the plurality of blades of the respective EDFs; and
   a pair of armpit supports, wherein each of the pair of armpit supports comprises a first bar and a second bar, wherein the first bar and the second bar are configured such that the first bar is inserted into the second bar and slidable within the second bar between two predetermined positions, wherein a first of the at least eight (8) EDFs is attached to one end of a first armpit support of the pair of armpit supports, wherein a second of the at least eight (8) EDFs is attached to one end of a second armpit support of the pair of armpit supports, wherein a third of the at least eight (8) EDFs is attached to another end of the first armpit support, wherein a fourth of the at least eight (8) EDFs is attached to another end of the second armpit support, wherein the first EDF is attached to the third EDF and the second EDF is attached to the fourth EDF such that the armpit supports are parallel to each other.

2. The flight system according to claim 1, further comprising:

first means for attaching the first, second, third and fourth of the at least eight (8) EDFs to a torso of a body of a user with the armpit supports disposed under each of armpits of the user, with the first EDF disposed adjacent a front oldie torso of the user on a right side of the user's body, with the second EDF disposed adjacent the front of the torso of the user on a left side of the user's body, with the third EDF disposed adjacent a back of the torso on the right side of the user's body, with the fourth EDF disposed adjacent the back of the torso on the left side of the user's body, and with the first, second third and fourth EDFs oriented to provide a downward thrust toward the ground with the user in an upright position vertical to the ground so as to apply an upward force to the user when the first, second, third and fourth EDFs are activated;

second means for attaching a fifth of the EDFs to an ankle on the right side of the user's body with the fifth EDF oriented to provide a downward thrust toward the ground with the user in the upright position so as to apply an upward force to the user when the filth EDF is activated;

third means for attaching a sixth of the EDFs to an ankle on the left side of the user's body with the sixth EDF oriented to provide a downward thrust toward the ground with the user in the upright position so as to apply an upward force to the user when the sixth EDF is activated;

fourth means for attaching a seventh of the EDFs to a wrist on the right side of the user's body with the seventh EDF oriented to enable the user to provide a thrust in any of a plurality of directions upon movement of the right wrist of the user;

fifth means for attaching an eighth of the EDFs to a wrist on the left side of the user's body with the eighth EDF oriented to enable the user to provide a thrust in any of a plurality of directions upon movement of the left wrist of the user;

control means disposed on each of the seventh and eighth EDFs for enabling the user to control activation and speed of rotation of the respective blades of the at least eight (8) EDFs such that, with the first, second, third, fourth, fifth and sixth EDFs attached to the respective torso and ankle of the user and the seventh and eighth EDFs attached to the left and right wrists of the user respectively, the user can activate the at least eight EDFs and can selectively control rotation of the plurality of blades of the respective first, second, third, fourth, fifth and sixth EDFs such that the user can cause them to rotate at the same speed of rotation to provide a combined downward thrust toward the ground with the user in the upright position and the user can also cause a preferential increase in the speed of rotation of the third and fourth EDFs to create a disproportionate thrust of the third and fourth EDFs toward the ground that applies a force that causes the user to tilt forward from the upright position and moves the user forward;

wherein the combined downward thrust toward the ground of the first, second, third, fourth, fifth and sixth EDFs is sufficient to lift a user weighing more than 75 lbs off of the ground and into a flight.

3. The flight system according to claim 1, wherein the plurality of blades of the first, third, fifth and seventh EDFs rotate in an opposite direction to the plurality of blades of the second, fourth, sixth and eighth EDFs to inhibit yaw or roll due to centrifugal force of rotation of the plurality of blades.

4. The flight system according to claim 1, further comprising stabilizing means for detecting respective directions at which the respective first, second, third, fourth, fifth and sixth EDFs are generating thrust while the user is in the flight and, if the detected directions of thrust are such as to render the flight unstable according to a predetermined standard, for automatically adjusting respective speeds of rotation of the respective blades of the EDFs to stabilize the flight.

5. The flight system according to claim 4, wherein the stabilizing means comprises an accelerometer and a computer board.

6. A flight system for an individual user, comprising:

at least ten (10) electric ducted fans (EDFs), each of the at least ten (10) EDFs comprising a plurality of blades, a motor and an electronic speed control unit that controls a speed of rotation of the plurality of blades of the respective EDFs; and a pair of armpit supports, wherein each of the pair of armpit supports comprises a first bar and a second bar, wherein the first bar and the second bar are configured such that the first bar is inserted into the second bar and slidable within the second bar between two predetermined positions, wherein a first of the at least eight (10) EDFs is attached to one end of a first armpit support of the pair of armpit supports, wherein a second of the at least eight (10) EDFs is attached to one end of a second armpit support of the pair of armpit supports, wherein a third of the at least eight (10) EDFs is attached to another end of the first armpit support, wherein a fourth of the at least eight (10) EDFs is attached to another end of the second armpit support, wherein the first EDF is attached to the third EDF and the second EDF is attached to the fourth EDF such that the armpit supports are parallel to each other.

7. The flight system according to claim 6, further comprising:

first means for attaching the first, second, third, fourth, ninth and tenth of the at least ten (10) EDFs to a body of a user with the armpit supports disposed under each of armpits of the user, with the first EDF disposed adjacent a front of a torso of the user on a right side of the user's body, with the second EDF disposed adjacent the front of the torso of the user on a left side of the user's body, with the third EDF disposed adjacent a back of the torso on the right side of the user's body, with the fourth EDF disposed adjacent the back of the torso on the left side of the user's body, with the ninth EDF disposed adjacent the third EDF and spaced from the back of the torso on the right side of the user's body, with the tenth EDF disposed adjacent the fourth EDF and spaced from the back of the torso on the lefts side of the user's body, with the first, second, third and fourth EDFs oriented to provide a downward thrust toward the ground with the user in an upright position vertical to the ground so as to apply an upward force to the user when the first, second, third and fourth EDFs are activated, and with the ninth and tenth EDFs oriented to provide a backward thrust that is transverse to the downward thrust with the user in the upright position so as to apply a force that propels the user forward when the ninth and tenth EDFs are activated:

second means for attaching a fifth of the EDFs to an ankle on the right side of the user's body with the fifth EDF oriented to provide a downward thrust toward the ground with the user in the upright position so as to apply an upward force to the user when the fifth EDF is activated;

third means for attaching a sixth of the EDFs to an ankle on the left side of the user's body with the sixth EDF oriented to provide a downward thrust toward the ground with the user in the upright position so as to apply an upward force to the user when the sixth EDF is activated;

fourth means for attaching a seventh of the EDFs to a wrist on the right side of the user's body with the seventh EDF oriented to enable the user to provide a thrust in any of a plurality of directions upon movement of the right wrist of the user;

fifth means for attaching an eighth of the EDFs to a wrist on the left side of the user's body with the eighth EDF oriented to enable the user to provide a thrust in any of a plurality of directions upon movement of the left wrist of the user;

control means disposed on each of the seventh and eighth EDFs for enabling the user to control activation and speed of rotation of the respective blades of the at least ten (10) EDFs such that, with the first, second, third, fourth, fifth, sixth, ninth and tenth EDFs attached to the torso and ankles of the user and the seventh and eighth EDFs attached to the left and right wrists of the user respectively, the user can activate the at least ten EDFs and can selectively control rotation of the plurality of blades of the respective first, second, third, fourth, fifth and sixth EDFs to cause them to rotate at the same speed of rotation to provide a combined downward thrust toward the ground with the user in the upright position and the user can also activate and control speeds of rotation of the plurality of blades of the respective ninth and tenth EDFs to provide a backward thrust to propel the user forward;

wherein the combined downward thrust toward the ground of the first, second, third, fourth, fifth and sixth EDFs is sufficient to lift a user weighing more than 75 lbs off of the ground and into a flight.

8. The flight system according to claim 7, wherein the plurality of blades of the first, third, fifth, seventh and ninth EDFs rotate in an opposite direction to the plurality of blades of the second, fourth, sixth, eighth and tenth EDFs to inhibit yaw or roll due to centrifugal force of rotation of the plurality of blades.

9. The flight system according to claim 7, further comprising stabilizing means for detecting respective directions at which the respective first, second, third, fourth, fifth, sixth, ninth and tenth EDFs are generating thrust while the user is in the flight and, if the detected directions of thrust are such as to render the flight unstable according to a predetermined standard, for automatically adjusting respective speeds of rotation of the respective blades of the EDFs to stabilize the flight.

10. The flight system according to claim 9, wherein the stabilizing means comprises an accelerometer and a computer board.

11. The flight system according, to claim 7, further comprising an eleventh EDF and a twelfth EDF, wherein the first means attaches the first, second, third, fourth, ninth, tenth, eleventh and twelfth EDFs to the torso of the user with the eleventh EDF disposed below the ninth EDF and spaced from the back of the torso on the right side of the user's body, with the twelfth EDF disposed below the tenth EDF and spaced from the back of the torso on the left side of the user's body, and with the eleventh and twelfth EDFs oriented to provide a backward thrust that is transverse to the downward thrust with the user in the upright position so as to apply a force that propels the user forward when the eleventh and twelfth EDFs are activated.

12. A method for individual flight comprising the steps of:
providing the flight system according to claim 1,
attaching the at least eight (8) EDFs to respective parts of the body of an user; and
using the control means to activate and control rotation of the plurality of blades of the first, second third, fourth, fifth and sixth EDFs to cause a downward thrust that propels the user into night.

13. The method according to claim 12, further comprising using the control means to cause a preferential increase in the speed of rotation of the third and fourth EDFs to create a disproportionate thrust toward the ground that propels the user forward.

14. A method for individual flight comprising the steps of:
providing the flight system according to claim 5,
attaching the at least ten (10) EDF to respective parts of the body of a user; and
using the control means to activate and control rotation of the plurality of blades of the first, second third, fourth, fifth and sixth EDFs to cause a downward thrust that propels the user into flight.

15. The method according to claim 14, further comprising using the control means to cause the ninth and tenth EDFs to provide a backward thrust to propel the user forward.

16. The method according to claim 15, further comprising:
causing the ninth and tenth EDFs to apply a backward thrust to an upper portion of the user's body, moving the user forward and tilting the upper portion of the user's body forward in an air;
measuring an angle change of at least one of the first, second, third, fourth, ninth, and tenth EDFs; and
generating a downward thrust by the first, second, third, and fourth EDFs to compensate for an upward thrust generate by the ninth and tenth EDFs due to the angle change;
wherein an overall backward thrust is at least a vector sum of backward thrusts of the first, second, third, fourth, ninth, and tenth EDFs.

17. The flight system according to claim 7, wherein each of the armpit supports is cylindrical, wherein an internal radius of a circular top of the first bar of each of the armpit supports is 0.80 inches, wherein an external radius of a circular top of the first bar is 0.90 inches, wherein an internal radius of a circular top of the second bar of each of the armpit supports is 0.90 inches, and wherein an external radius of a circular top of the second bar is 1.00 inch.

18. The flight system according to claim 17, wherein a length of the first bar is 4.50 inches, wherein a length of the second bar is 8.00 inches, wherein a length of each of the armpit support is adjustable between 8.00 inches and 13.50 inches.

19. An apparatus for a flight system for an individual user, the apparatus comprising:
(a) at least four (4) electric ducted fans (EDFs), each of the at least four (4) EDFs comprising a plurality of blades, a motor and an electronic speed control unit that, controls a speed of rotation of the plurality of blades of the respective EDFs;
(b) first means for connecting a first of the at least four EDFs to a second of the at least tour EDFs and second means for connecting a third of the at least four EDFs to a fourth of the at least four EDFs;
(c) a pair of armpit supports comprising a first bar comprising respective first and second end portions and a middle portion there between and a second bar comprising respective first and second end portions and a middle portion there between, wherein the respective first and second end portions of the first bar connect an outer surface of the first EDF to an outer surface of the third EDF at a predetermined distance from one another and the respective first and second end portions of the second bar connect an outer surface of the second EDF to an outer surface of the fourth EDF at the predetermined distance from one another, wherein with the first means connecting the respective first and second EDFs, the second means connecting, the respective third and fourth EDFs, the first bar connecting the respective outer surfaces of the first and third EDFs and the second bar connecting the respective outer surfaces of the second and fourth EDFs (a) the first and second bars are disposed parallel to one another, (b) all of the at least four EDFs are oriented to provide thrust in the same direction, and (c) the at least four EDFs and the first and second bars are arranged with respect to each other for disposition as a modular unit relative to a body of a user with the middle portions of the first and second bars disposed under respective left and right armpits of the user with the first and second EDFs adjacent a front of a torso of the user and with the third and fourth of the EDFs adjacent a back of the torso of the user; and
(d) means for securing the modular unit around respective left and right shoulders of the user with the modular unit in the disposition.

20. The apparatus according to claim 19, wherein each of the first and second bars comprises means for adjusting a length of the bars so that the predetermined distance separating the respective first and third EDFs and the respective second and fourth EDFs can be adjusted by adjusting the length of the bars.

21. The apparatus according to claim 19, wherein each of the first means and second means is adjustable such that a distance between the respective first and second EDF and the respective third and fourth EDF can be adjusted by adjusting the first and second means.

22. The apparatus according to claim 19, further comprising fifth, sixth, seventh and eighth EDFs, the fifth and sixth EDFs being connected to the third EDF and to each other and the seventh and eighth EDFS being connected to the fourth EDF and to each other, the fifth, sixth, seventh and eighth EDFs being oriented such that they produce a thrust that is traverse to the thrust produced by the first, second, third and fourth EDFs.

* * * * *